(12) United States Patent
Le et al.

(10) Patent No.: US 10,657,105 B2
(45) Date of Patent: May 19, 2020

(54) METHOD AND COMPUTER SYSTEM FOR SHARING OBJECTS

(71) Applicant: Hitachi, Ltd., Tokyo (JP)

(72) Inventors: Hieuhanh Le, Tokyo (JP); Masanori Takata, Tokyo (JP); Yoji Nakatani, Tokyo (JP); Hitoshi Arai, Tokyo (JP); Hitoshi Kamei, Tokyo (JP); Akiyoshi Tsuchiya, Tokyo (JP); Atsushi Sutoh, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 487 days.

(21) Appl. No.: 15/507,684

(22) PCT Filed: Oct. 30, 2014

(86) PCT No.: PCT/JP2014/005496
§ 371 (c)(1),
(2) Date: Feb. 28, 2017

(87) PCT Pub. No.: WO2016/067320
PCT Pub. Date: May 6, 2016

(65) Prior Publication Data
US 2017/0286447 A1    Oct. 5, 2017

(51) Int. Cl.
*G06F 16/182*    (2019.01)
*G06F 16/176*    (2019.01)
*G06F 16/11*    (2019.01)

(52) U.S. Cl.
CPC ........ *G06F 16/1774* (2019.01); *G06F 16/122* (2019.01); *G06F 16/182* (2019.01)

(58) Field of Classification Search
CPC .................................................. G06F 16/1774
(Continued)

(56) References Cited

U.S. PATENT DOCUMENTS 8,661,063 B2    2/2014 Mason, Jr. et al.
2007/0112771 A1*    5/2007 Maybee .............. G06F 16/1774
(Continued)

OTHER PUBLICATIONS

International Search Report and Written Opinion for PCT App No. PCT/JP2014/005496 dated Aug. 4, 2015, 9 pgs.

*Primary Examiner* — Alford W Kindred
*Assistant Examiner* — Allen S Lin
(74) *Attorney, Agent, or Firm* — Procopio, Cory, Hargreaves & Savitch LLP

(57) ABSTRACT

A computer system for sharing objects comprises multiple front-end nodes and a back-end node for providing a namespace shared by the front-end nodes. A first front-end node that is any one of the front-end nodes manages local-lock counts for each of objects managed by the first front-end node. The local-lock count is the number of locks taken by operations to the objects including the directory and sub-objects thereof. Every time receiving a request for processing a target object from a client, the front-end node requests the back-end node to lock a parent directory of the target object if the parent directory has not been locked by the back-end node. The front-end node sends a response of the received request to the client regardless of whether or not the parent directory has been unlocked by the back-end node. If the local-lock count of the parent directory is zero, the first front-end node requests the back-end node to unlock the parent directory.

11 Claims, 21 Drawing Sheets

(58) Field of Classification Search
USPC .......................................................... 707/610
See application file for complete search history.

(56) References Cited

U.S. PATENT DOCUMENTS

2012/0005193 A1* 1/2012 Nemoto ................ G06F 16/185
707/722
2014/0006465 A1* 1/2014 Davis .................... G06F 16/182
707/827

* cited by examiner

METHOD AND COMPUTER SYSTEM FOR SHARING OBJECTS

CROSS-REFERENCE TO RELATED APPLICATIONS

This application is a U.S. National Stage entry of PCT Application No: PCT/JP2014/005496 filed Oct. 30, 2014, the contents of which are incorporated herein by reference.

TECHNICAL FIELD

The present invention generally relates to a technology for sharing objects such as directories and files.

BACKGROUND ART

There is a high demand of cloud storage systems which deliver local NAS (Network Attached Storage) features to globally distributed sites. For a company with multiple globally distributed sites, users at each site are able to perform general NAS features such as creating, deleting or copying of directories or files on the same file systems that are shared among sites.

For example, there is a file system in which a CAS (Content Addressed Storage) is located at a data center, multiple NAS apparatuses are located at sites such as departments of a company, the CAS apparatus and the NAS apparatuses are connected via a communication network such as WAN (Wide Area Network). The file system is shared among users using the NAS apparatuses and its namespace and data are intensively managed at the CAS apparatus. Via the NAS apparatus, every user at each site is able to perform read or write operations that modify the sharing namespace such as creating or deleting directories or files. To provide such functionalities, the consistency of the shared namespace must be maintained carefully.

To maintain the consistency of the shared namespace, specifically the systems should avoid the conflictions of modifying the same part of the namespace by creating or deleting the related files or directories. For instance, the confliction occurred when multiple users create the files with the same identifier (e.g. pathname), or multiple users create or delete multiple directories belonging to the same parent directory. It is well recognized that directory operations such as directory copies or archived file decompression, which create a directory that contains multiple sub-directories inside, makes the maintenance more difficult because it will lead to huge changes in the structure of the file system's namespace.

PTL1 discloses that the consistency of the namespace is guaranteed through a directory entry lock mechanism. The directory is only modified when its parent directory is locking. The locking is removed after the creation processing is finished. Here, the basic processing during directory operation such as locking the parent directory, executing the directory creating request, updating the entries inside the inodes that describe the contents of the directories are serialized consequently. PTL2 provides a method of data sharing among multiple entities via employing a distributed snapshot-lock on a versioning file system. When the entity wants to change the structure of the file system, it must first acquire the snapshot-lock to apply the changes to the current file system. And at the same time, the snapshot-lock is provided to one entity only.

CITATION LIST

Patent Literature

[PTL1] US 2007/0112771
[PTL2] U.S. Pat. No. 8,661,063

SUMMARY OF INVENTION

Technical Problem

However, the method described in the PTL1 is not suitable for the systems constructed by WAN environment. Locking every directory before processing generates to the high number of lock processing totally. Given the fact that every lock processing requires WAN connections, an extremely long processing time to complete the creating of the directory that contains multiple sub-directories is inevitable. For the system that is constructed in WAN environment, not only the locking process, other necessary processes such as the synchronization process to transfer the latest updated metadata at the CAS apparatus to the NAS apparatus, the migration processing to transfer the latest updated metadata from the NAS apparatus to the CAS apparatus also require several WAN connections.

Furthermore, although the method in PTL2 allows a shorter lock period when the entity applies the changes to the file system as locking is not required in migration of the body data, however locking of the whole structure of the file system is needed. It is very ineffective that during that period, other entities may change other parts of the namespace that in fact do not violate the overall consistency of the file system.

Solution to Problem

A computer system for sharing objects including at least directories comprises multiple front-end nodes and a back-end node for providing a namespace shared by the front-end nodes. A first front-end node that is any one of the front-end nodes manages local-lock counts for each of directories managed by the first front-end node. The local-lock count is the number of locks taken by operations to the objects including the directory and sub-objects thereof. Every time receiving a request for processing a target object from a client, the front-end node requests the back-end node to lock a parent directory of the target object if the parent directory has not been locked by the back-end node. The front-end node sends a response of the received request to the client regardless of whether or not the parent directory has been unlocked by the backend node. If the local-lock count of the parent directory is zero, the first front-end node requests the back-end node to unlock the parent directory.

The front-end nodes may be computers (storage apparatuses) such as file servers and NAS apparatuses. The back-end node may be a computer (storage apparatus) such as a file server and a CAS apparatus.

Advantageous Effects of Invention

It is possible to reduce the frequency of communication for locking and unlocking between the first front-end node and the back-end node. Accordingly it is possible to shorten the time of processing, especially the time of processing for an object and a child object thereof.

DESCRIPTION OF EMBODIMENTS

Figure 1:
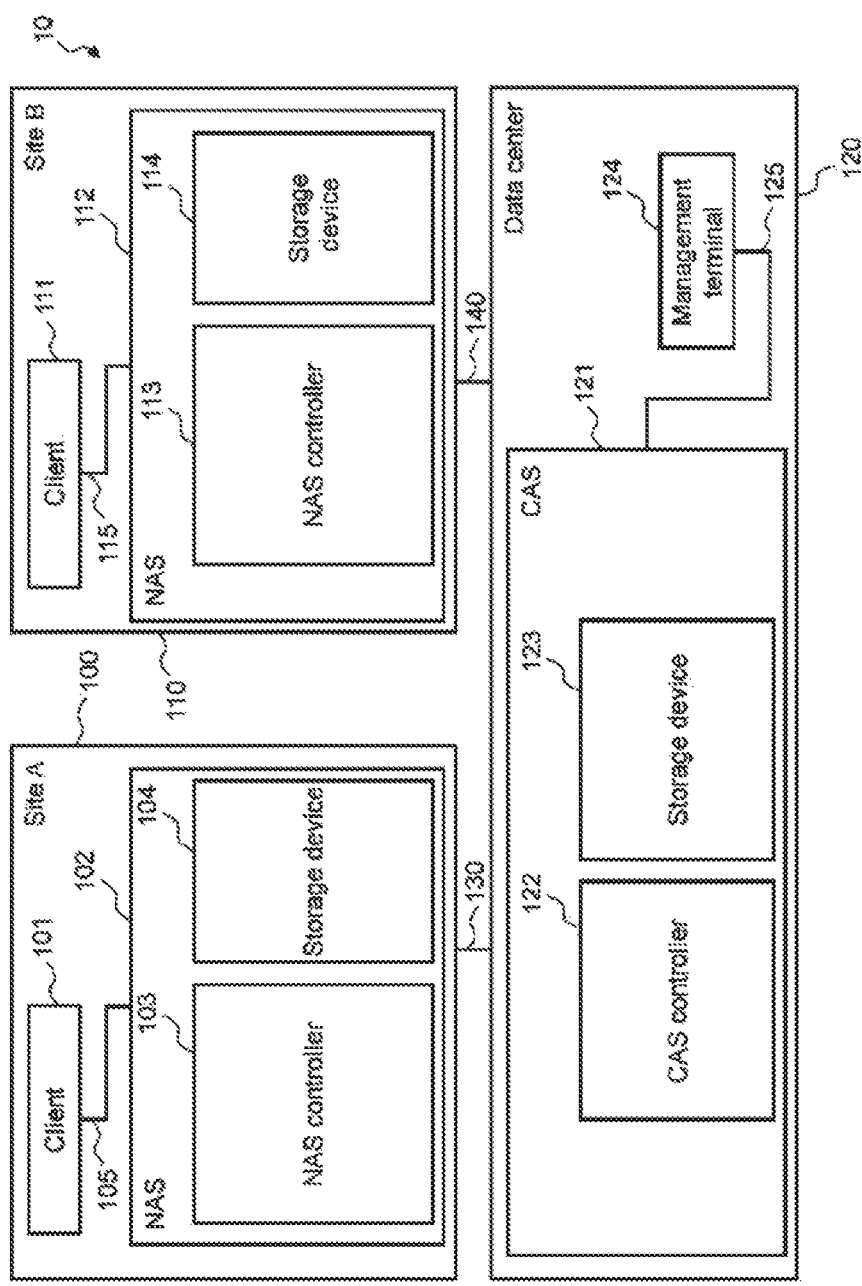
FIG. 1 is a diagram showing the physical schematic configuration of the information processing system according to the first embodiment of the present invention.

Hereinafter, embodiments of the present invention are explained with reference to the attached figures. In the attached figures, the components which are functionally equal might be referred to by the same number. It should be noted that the attached figures show concrete embodiments and implementation examples complying with the principle of the present invention, but that these are for the ease of understanding the present invention and is by no means used for any limited interpretation of the present invention.

Though these embodiments are explained in enough detail for those skilled in the art to practice the present invention, it must be understood that other implementations and embodiments are also possible and that it is possible to change the configuration and the structure and to replace various components within the spirit and scope of the technical idea of the present invention. Therefore, the description below must not be interpreted limited to these embodiments.

Furthermore, as explained later, the embodiments of the present invention may also be implemented by the software operating in the general-purpose computer, by dedicated hardware, or by a combination of the software and the hardware.

It should be noted that, though the information used by the present invention is explained with tables and lists as examples in the figures of this description, the information is not limited to the information provided in the table and list structures, the information which does not depend on the data structure may also be permitted.

Furthermore, the expressions of "identification information", "identifier", "name", "appellation", and "ID" are used for explaining the contents of each types of information, and it is possible to replace these mutually.

In the embodiments of the present invention, the communication network for the NAS and CAS devices is not limited to the adoption of WAN, and it may also be permitted to adopt the communication network such as LAN (Local Area Network). An aspect of the present invention is not limited to the adoption of the NFS (Network File System) protocol, and it may also be permitted to adopt other file sharing protocols including CIFS (Common Internet File System), HTTP (Hypertext Transfer Protocol), and others.

In the explanation below, the processing might be explained by a "program" as a subject, but the subject of the explanation may also be processor because the program performs the specified processing by being performed by the processor while using a memory and a communication port (a communication control device). Furthermore, the processing which is disclosed with a program as the subject may also be considered to be the processing performed by a computer and an information processing device such as a management server. A part or all of the programs may be realized by dedicated hardware or may also be modularized. Various types of programs may also be installed in the respective computers by a program distribution server or storage media.

Furthermore, in the following explanation, "directory of attention" or "file of directory" is one directory or file (directory or file receiving attention) in multiple directories or files. A directory higher than the directory or file of attention can be referred to as "higher-level directory," in particular, among higher-level directories to the directory of attention, a directory higher by one level than the directory or file of attention can be referred to as "parent directory" to the directory or file of attention. A file included in a higher-level directory can be referred to as "higher-level file," and a file included in a parent directory can be referred to as "parent file." A directory or file lower than the directory of attention can be referred to as "lower-level directory" or "lower-level file." in particular, among lower-level directories or files to the directory of attention, a directory or file lower by one level than the directory of attention can be referred to as "sub-directory" or "sub-file" to the directory or file of attention. Hereinafter, when a directory is simply referred to as "higher-level directory," "parent directory," "lower-level directory," "lower-level file," "sub-directory," or "sub-file" without specifying a reference, the directory or file of attention is assumed to be the reference.

(1) First Embodiment (1-1) Configuration of the Computer System
(1-1-1) Physical System Configuration FIG. 1 is a block diagram showing an example of the physical configuration of the system according to the first embodiment of the present invention (referred to as "information processing system," "integrated storage system," or "computer system"). It should be noted that, though only the site A (Site A) and the site B (Site B) are shown in FIG. 1, more sites may also be included in the system, and the configuration of each of the sites can be made similar.

The relevant computer system 10 comprises one or more sub-computer systems 100 and 110 located in each of the sites and a data center system 120 configured of a CAS apparatus 121, and each of the sub-computer systems 100 and 110 and the data center system 120 are connected via networks 130 and 140.

The sub-computer systems 100 and 110 comprise clients 101 and 111 and NAS apparatuses 102 and 112, which are connected via networks 105 and 115. The clients 101 and 111 are one or more computers utilizing the file sharing service provided by the NAS apparatuses 102 and 112. The clients 101 and 111 utilize the file sharing service provided by the NAS apparatuses 102 and 112 via the networks 105 and 115 by utilizing the file sharing protocols such as NFS (Network File System) and CIFS (Common Internet File System).

The NAS apparatuses 102 and 112 comprise NAS controllers 103 and 113 and storage devices 104 and 114. The NAS controllers 103 and 113 provide the file sharing service to the clients 101 and 111, and also comprise the collaboration function with the CAS apparatus 121. The NAS controllers 103 and 113 store various types of files and file system configuration information which the clients 101 and 111 create in the storage devices 104 and 114.

The storage devices 104 and 114 provide volumes to the NAS controllers 103 and 113, and the NAS controllers 103 and 113 store the various types of files and file system configuration information in the same.

The data center 120 comprises a CAS apparatus 121 and a management terminal 124, which are connected via a network 125. The CAS apparatus 121 is a storage device which is the archive and backup destination of the NAS apparatuses 102 and 112. The management terminal 124 is a computer used by the administrator managing the computer system 10. The administrator manages the CAS apparatus 121 and the NAS apparatuses 102 and 112 from the management terminal 124 via the network 125. The management of the same is, for example, starting to operate the file server, terminating the file server, managing the accounts of the clients 101 and 111, and others. It should be noted that the management terminal 124 comprises an input/output device. As examples of the input/output devices, a display, a printer, a keyboard, and a pointer device can be considered, and other devices than these (e.g. a speaker, a microphone, and others) may also be permitted. Furthermore, as the substitute for the input/output device, the configuration where a serial interface is made an input/output device and a display computer comprising a display, a keyboard, or a pointer device is connected to the relevant interface may also be permitted. In this case, the display may also be performed on the display computer by transmitting the display information to the display computer and receiving the input information from the display computer, and the input and display in the input/output device may also be replaced by accepting the input.

Hereinafter, a set of one or more computers which manage the computer system and display the display information of the present invention might be referred to as a management system. The management terminal 124, if displaying the display information, is a management system. Furthermore, a combination of the management terminal 124 and the display computer is also a management system. Furthermore, for improving the speed and the reliability of the management processing, the processing equivalent to the management terminal 124 may also be realized by a plurality of computers, in which case, the relevant plurality of computers are referred to as a management system. Furthermore, the management terminal 124 is installed in the data center 120 in this embodiment, but may also be installed outside the data center 120 as an independent existence.

The network 105 is the site LAN in Site A 100, the network 115 is the site LAN in Site B 110, the network 125 is the data center LAN in the data center 120, the network 130 performs the network connection between Site A 100 and the data center 120 by WAN, and the network 140 performs the network connection between Site B 110 and the data center 120 by WAN. The type of network is not limited to the above networks, and various types of networks are available. For example, at least one of the networks 130 and 140 may be internet. Furthermore, the networks 130 and 140 may be a common single network.

(1-1-2) Logical System Configuration

Figure 2:
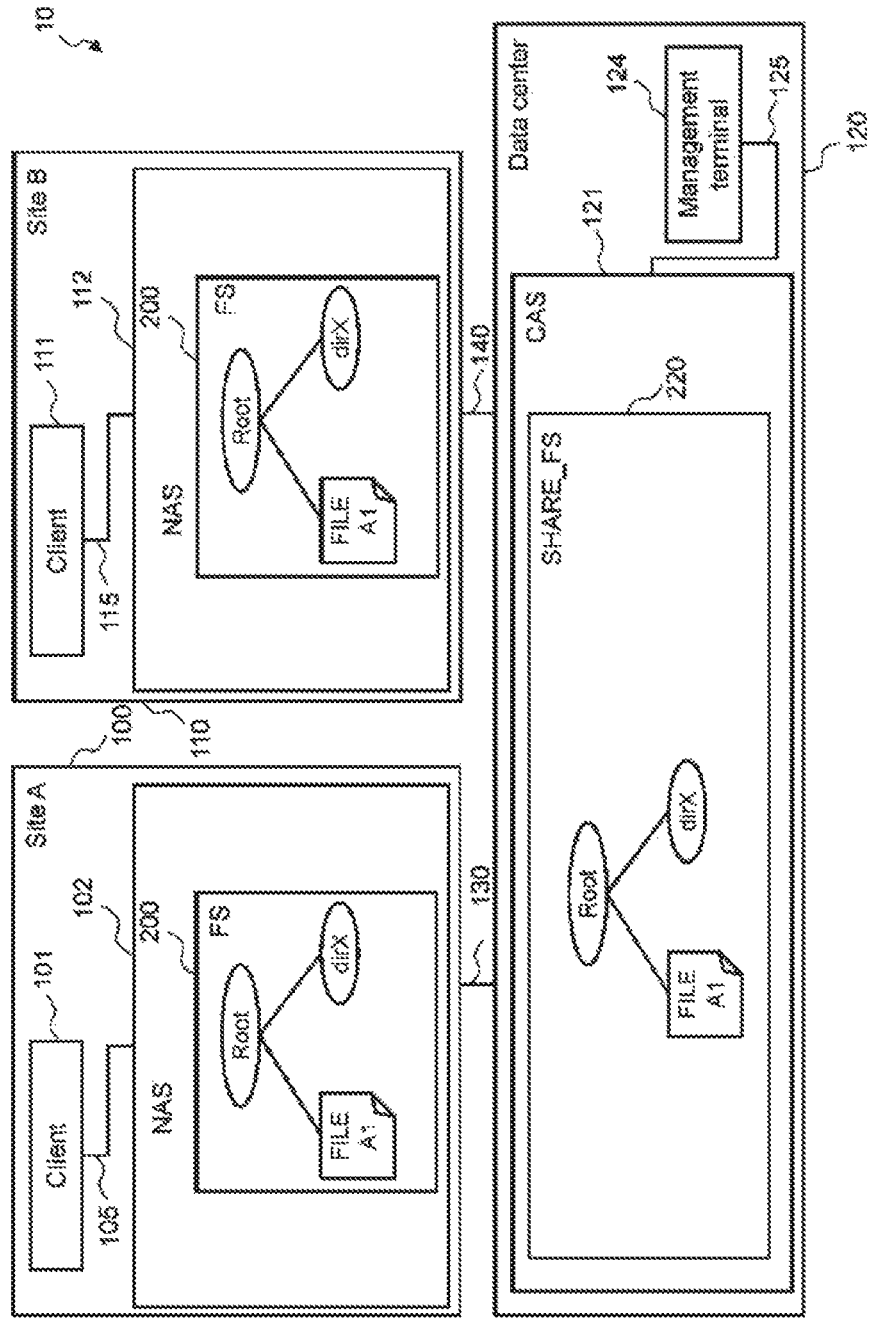
FIG. 2 is a diagram showing the logical configuration of the information processing system according to the first embodiment of the present invention.

FIG. 2 is a block diagram showing an example of the logical configuration of the information processing system according to the first embodiment of the present invention. In the relevant information processing system 10, the client 101 of site A 100 and the client 111 of Site B 110 read and write the data which is stored as files and directories in a file system FS_200. The data of file system FS_200 is intensively managed by the SHARE_FS_220 (a namespace) created at the CAS apparatus 121. Objects such as directories and files managed in the namespace can typically form a tree structure.

The client 101 and the client 102 logically view the same file system. Thus, for example, the client 101 can read the files which the client 102 created, or the client 102 can view the content of the directories created by the client 101. The client 101 cannot create a directory that already exists, without relation to whom created it.

(1-1-3) Internal Configuration of NAS Apparatus

Figure 3:
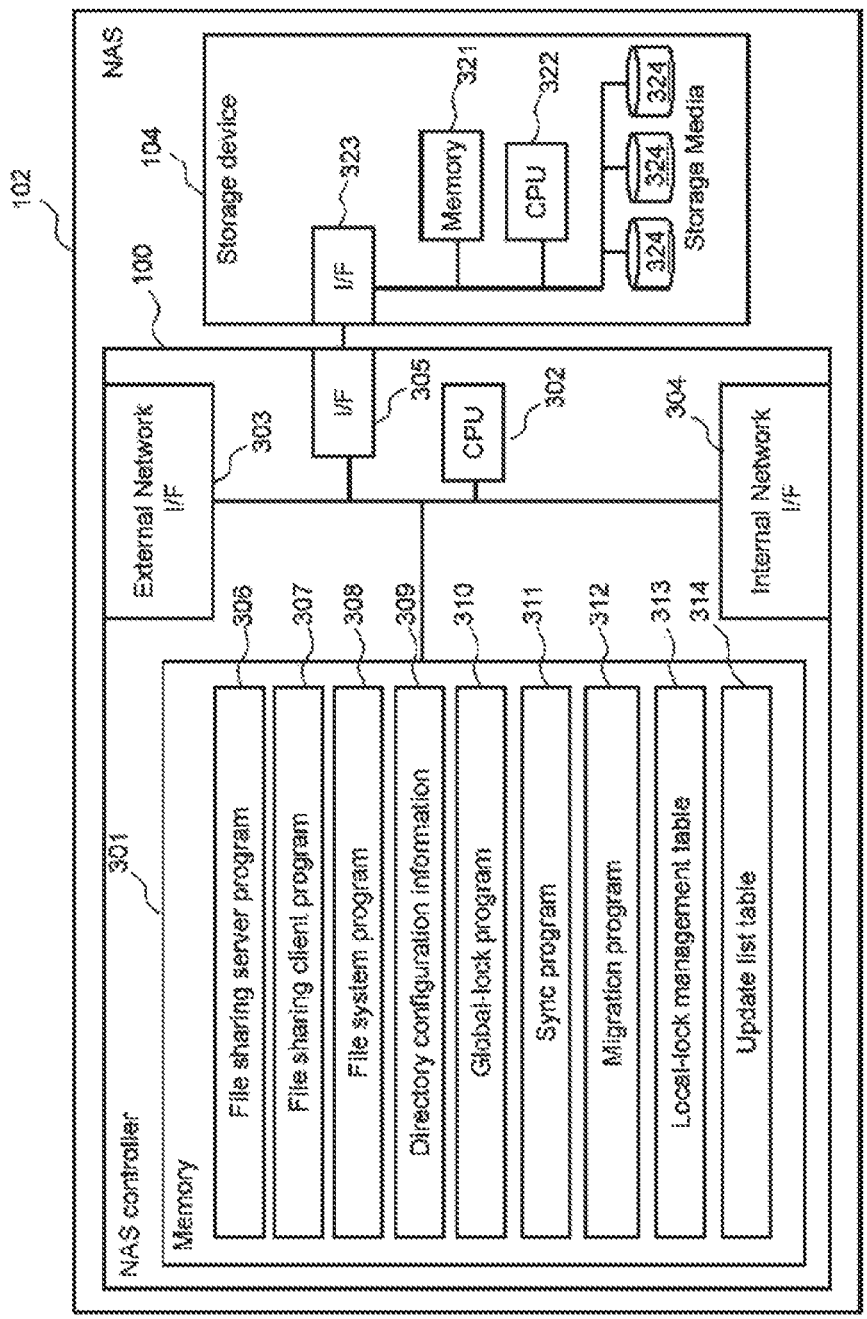
FIG. 3 is a diagram showing the hardware configuration and the software configuration of the NAS apparatus according to the first embodiment of the present invention.

FIG. 3 is a block diagram showing an example of the internal configuration of the NAS apparatus 102. While FIG. 3 shows the configuration of the NAS apparatus 102 in Site A 100, the NAS apparatus 112 in Site B 110 is in the same configuration.

The NAS apparatus 102 comprises a NAS controller 103 and a storage device 104.

The NAS controller 103 comprises a CPU (Central Processing Unit) 302 for performing programs stored in a memory 301, an external network I/F (interface) 303 used for the communication with the client 101 via the network 105, an internal network I/F 304 used for the communication with the data center 120 via the network 130, an interface (showing as I/F in the drawing) 305 used for the connection with the storage device 104, and the memory 301 for storing the programs and data, which are connected by an internal communication path (e.g. a bus).

The memory 301 involves a file sharing server program 306, a file sharing client program 307, a file system program 308, a directory configuration information 309, a global-lock program 310, a sync program 311, a migration program 312, a local-lock management table 313 and an update list table 314.

The file sharing server program 306 is a program for controlling file sharing between file servers. The file sharing client program 307 is a program for providing a file sharing service to the client 101. The file system program 308 is a program for managing the file system such as file or directory generation. The sync program 311 is a program for providing data synchronization between the NAS 102 and the CAS 120. The migration program 312 is a program for performing the data migration from the NAS 102 to the CAS 120.

Figure 6:
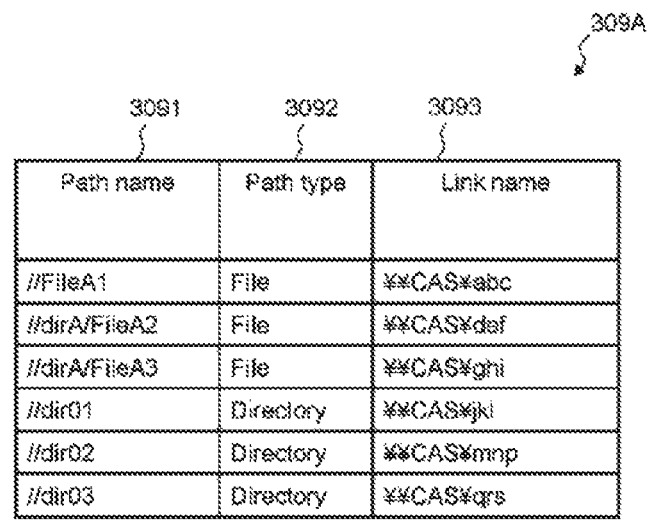
FIG. 6 is a chart showing an example of directory configuration information according to the first embodiment of the present invention.

The directory configuration information 309 is a table for managing various pieces of information such as files and directories and is used by all programs at the NAS apparatuses and the CAS apparatus for mapping the files or directories at NAS apparatuses to the files at the CAS apparatus. As shown in FIG. 6, the directory configuration information 309A which is the directory configuration information in Site A, is constituted from one or more records. The configuration of the other directory configuration information can be the same. Each record corresponds to an object (in other words, a file system element such as a file or a directory). Each record comprises a path name field 3091, a path type field 3092 and a link name field 3093. The path name field 3091 stores the path name which is the name of the path from the root directory to the target object (the file or the directory) in the file system (namespace). Each path name can include a target object name (e.g. "FileA2"). The path type field 3092 stores the path type (in other words, the object type) such as "File" or "Directory." The link name field 3093 stores the name of the link to the object (actual object) in the CAS apparatus 121 from the target object in the file system (namespace).

Referring to FIG. 6, for example, the path type of the path name "//FileA1" is "File", its link name is "\\CAS\abc." Furthermore, the path type of a path name "//dirA/FileA2" is "File" and its link name is "\\CAS\def." Furthermore, the path type of the path name "//dirA/FileA3" is "File" and its link name is "\\CAS\ghi." Furthermore, the path type of the path name "//dir01" is "Directory" and its link name is "\\CAS\jkl." Furthermore, the path type of the path name "//dir02" is "Directory" and its link name is "\\CAS\mnp."

Referring back to FIG. 3, the global-lock program 310 is a program for processing the global-locking and the global-unlocking of files or directories in the file systems between the requesting NAS apparatus 102 and the CAS apparatus 121. In this embodiment, although both the global-locking and the global-unlocking functionality are executed by the global-lock program 310, it can be executed by a separate program, for example, a global-lock program for processing the global-locking and a global-unlocking program for processing the global-unlocking can be prepared in other embodiments.

Figure 7:
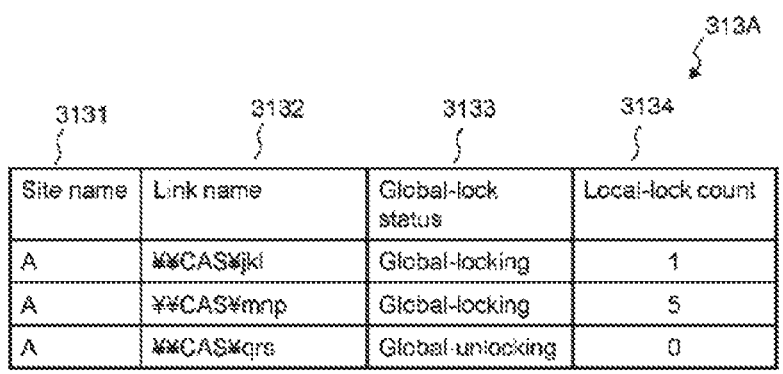
FIG. 7 is a chart showing an example of local-lock management table of the NAS apparatus, according to the first embodiment of the present invention.

In FIG. 3, the local-lock management table 313 is a table for managing various pieces of information such as link name and local-lock status. As shown in FIG. 7, the local-locking management table 313A which is the local-lock management table in Site A, is constituted from one or more records. The configuration of the other the local-locking management tables can be the same. Each record corresponds to an object (in other words, a file system element such as a file or a directory). Each record comprises a site name field 3131, a link name field 3132, a global-lock status field 3132 and a local-lock count field 3134. The site name field 3131 stores the name of the site. The link name field 3132 stores the name of the link. The global-lock status field 3123 maintains (stores) the global-lock the status (locking ("Global-locking") or unlocking ("Global-unlocking") of the relevant link name. The local-lock count field 3124 stores the local-lock count of relevant link name. The local-lock count corresponding to a directory indicates the number of the locks taken by operations (e.g. create or delete) to the objects, such as sub-directories and files, stored under the directory in progress.

Referring to FIG. 7, for example, as for the link name "\\CAS\jkl" refers to Site A, the global-lock status is "Global-locking," and the local-lock count is "1." Furthermore, as for the link name "\\CAS\mnp" refers to Site A, the global-lock status is "Global-locking," and the local-locking count is "5." Furthermore, as for the link name "\\CAS\qrs" refers to Site A, the global-lock status is "Global-unlocking" and the local-locking count is "0". Here, in this embodiment, by definition, the global-lock status of a link name is "Global-unlocking" if the relevant local-lock count is "0". The other similarly definitions can be applied to identify the global-lock status according to the value of the relevant local-lock account.

Figure 8:
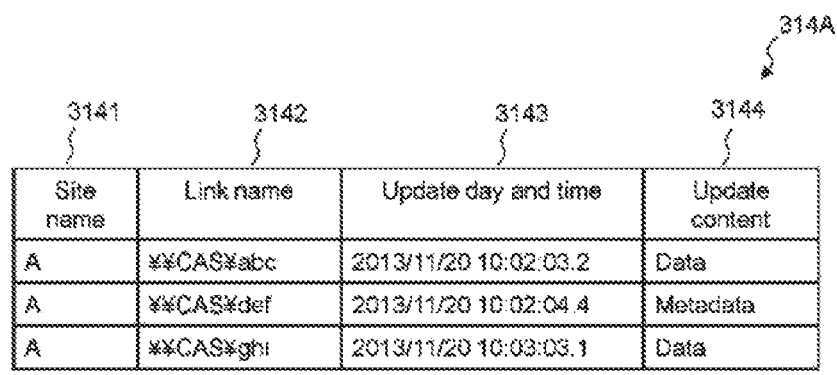
FIG. 8 is a chart showing an example of update file list of Site A, according to the first embodiment of the present invention.
Figure 9:
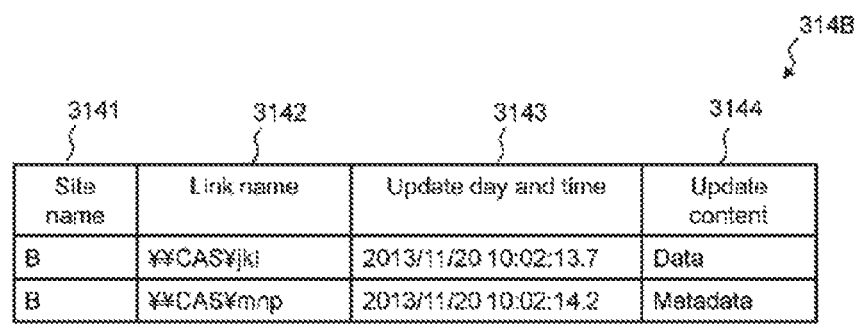
FIG. 9 is a chart showing an example of update file list of Site B, according to the first embodiment of the present invention.

Referring back to FIG. 3, the update list table 314 is a list for managing the update information of the files which the NAS apparatus 102 manages locally. FIG. 8 and FIG. 9 show configuration examples of the update list table 314A in the NAS apparatus 102 in Site A and the update list table 314B in the NAS apparatus 112 in Site B. The update table list table 314A is constituted from one or more records. The configuration of the other directory configuration information can be the same. Each record corresponds to an object (typically a file). Each record comprises a site name field 3141, a link name field 3142, an update day and time field 3143, and an update content field 3144.

The site name field 3141 maintains (stores) the name of the site in which the update is performed. The link name field 3142 stores the name of the link. The update date and time field 3143 retains (stores) the information indicating the date and time when the corresponding object (file or directory) is updated. The updated content field 3144 stores the information indicating whether the updated content is data or metadata. At this step, the metadata includes a user ID, permission, a file size, a file or a directory size, owner change information, and others.

The update list table 314A (or 314B) are created and updated by the NAS apparatus 102 (or 112) each time the migration is performed. Specifically, the update list table 314A is a list of link names stored in fields 3093 corresponding to files or directories which are updated between the N-th time of migration processing and the (N+1)-th time of migration processing (N is positive integer). In addition to the link names stored in fields 3093, the metadata of the relevant files or directories such as owners, whom the files are last updated by, and the last update dates and time may also be combined with the link names and recorded.

This type of update list table makes it possible to manage update status of the files or the directories in the site and notify the information of the file update status to the CAS apparatus 121.

Referring back to FIG. 3, the storage device 104 comprises a memory 321, a CPU 322, an interface (indicated as I/F in the drawing) 323, and storage media 324. The CPU 322 functions as an arithmetic processing unit and controls the operations of the entire storage device 104 in accordance with, for example, various programs and operation parameters stored in the memory 321. The interface 323 is an interface for connecting to the NAS controller 103 via the network.

The storage media 324 are entities for storing various data and examples of the storage media 324 can include HDDs (Hard Disk Drives). The HDDs may be composed of, for example, multiple HDDs which are expensive HDDs such as SCSI (Small Computer System Interface) disks or inexpensive HDDs such as SATA (Serial AT Attachment) disks. Furthermore, storage media other than the HDDs, such as flash memories, SSDs (Solid State Drives), DVDs (Digital Versatile Disks), optical disks, magneto-optical disks, CD-Rs, magnetic tapes may be also used.

(1-1-4) Internal Configuration of CAS Apparatus

Figure 4:
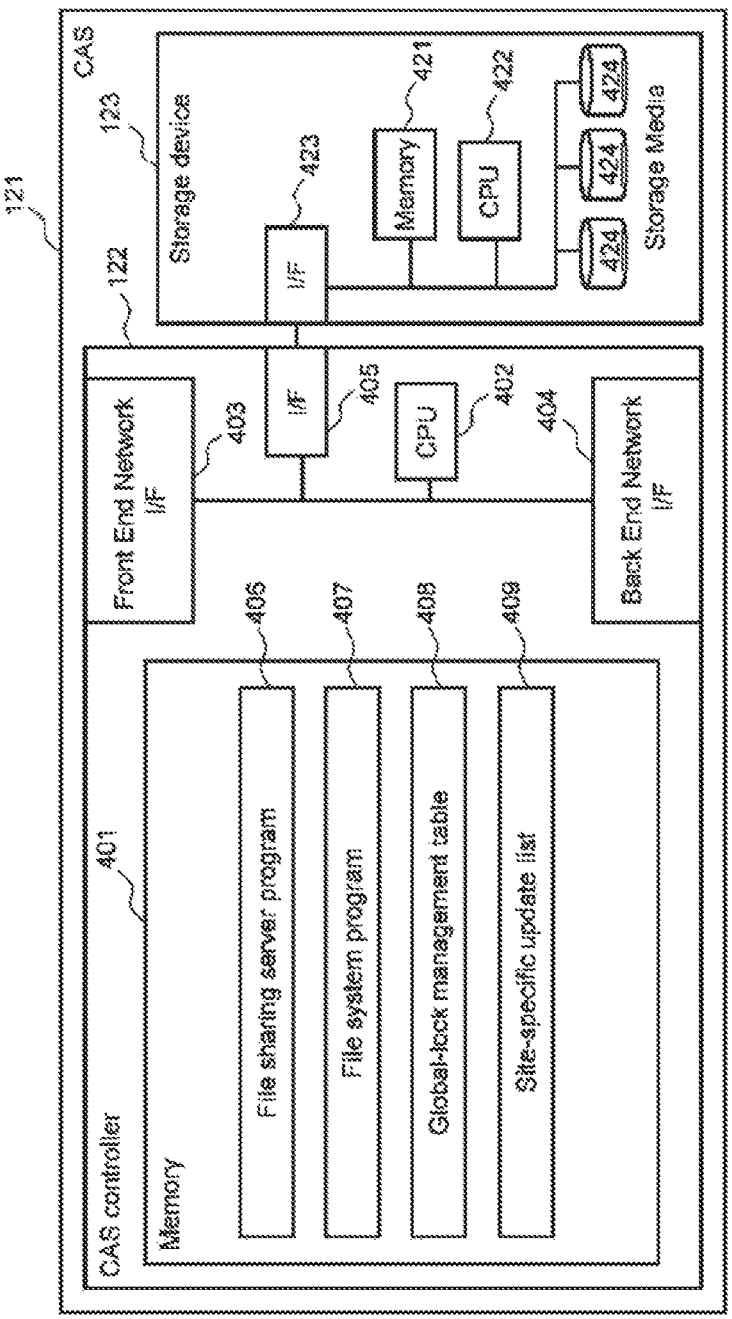
FIG. 4 is a diagram showing the hardware configuration and the software configuration of the CAS apparatus according to the first embodiment of the present invention.

FIG. 4 is a block diagram showing an example of the internal configuration of the CAS apparatus 121. The CAS apparatus 121 comprises a CAS controller 122 and a storage device 123.

The CAS controller 122 comprises a CPU 402 for performing programs stored in a memory 401, a front end network interface (shown as I/F in the drawing) 403 used for the communication with the NAS apparatuses 102 and 112 via the networks 130 and 140, a back end network interface (shown as I/F in the drawing) 404 used for the communication with the management terminal 124 via the network 125, an interface (shown as I/F in the drawing) 405 used for the connection with the storage device 123, and the memory 401 for storing the programs and data, which are connected by an internal communication path (e.g. a bus).

The memory 401 stores a file sharing server program 406, a file system program 407, a global-lock management table 408, and a site-specific update list 409. It should be noted that the aspect on which the respective programs from 406 to 408 and the site-specific update list 409 may also be stored in the storage device 123, read by the CPU 402 to the memory 401 and performed may also be permitted.

The file sharing server program 406 is a program for providing functions, to the NAS apparatuses 102 and 112, to perform file or directory operations for the files in the CAS apparatus 121. The file system program 407 controls the SHARE_FS 220.

Figure 10:
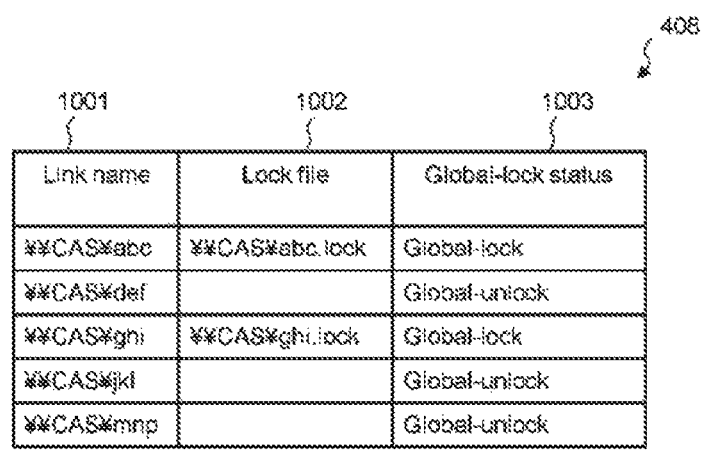
FIG. 10 is a chart showing an example of global-lock manage table of the CAS apparatus, according to the first embodiment of the present invention.

The global-lock manage table 408 maintains the global-lock status of the link names which are respectively corresponding to the objects (directories and files) in the file system identified by the directory configuration information 309. As shown in FIG. 10, the global-lock manage table 408 is constituted from one or more records. Each record corresponds to an object (a file or a directory). Each record comprises a link name field 1001, a lock file field 1002 and a lock status field 1003. The link name field 1001 stores the name of the link. The lock file field 1002 stores the lock file of the corresponding link name. Here, there is case that the lock file of one link name does not exist. The lock status field 1003 stores the global-lock status ("Global-locking" or "Global-unlocking"). For a link name stored in a field 1001, if its lock file specified from the field 1002 corresponding to the field 1001 exists (or does not exist), its global-lock status 1003 stores "Global-locking" (or "Global-unlocking"). Thus, the lock status of the lock name is whether "Global-locking" or "Global-unlocking". Here, in this embodiment, the global-locks status field 1003 is only used for easy understanding and can be ignored in other embodiments.

For example, in FIG. 10, as for the object corresponding to the link name "\\CAS\abc," there is the lock file whose name is "\\CAS\abc.lock" and its global-lock status is "Global-locking." Furthermore, as for the object corresponding to the link name "CAS\def," there is not a lock file, hence its global-locking status is "Global-unlocking." Furthermore, as for the object corresponding to the link name "\\CAS\ghi." there is the lock file whose name is "\\CAS\def.lock," hence its global-locking status is "Global-locking." Furthermore, as for the object corresponding to the link name "\\CAS\jkl," there is not a lock file, hence its global-locking status is "Global-unlocking." Furthermore, as for the object corresponding to the link name "\\CAS\mnp," there is not a lock file, hence its global-locking status is "Global-unlocking."

In this embodiment, as the above descriptions, the global-lock status of a directory is relating to the existence of the relevant lock file. For efficient implementation, to globally lock a directory, the global-lock program 310 simply pushes the corresponding lock file of the directory to the CAS apparatus 102. In contrast, to globally unlock a directory, the global-lock program 310 deletes the existing lock file of the directory. Other alternative approach is considerable such as setting the global-locking status directly without the existence of the lock files.

Figure 11:
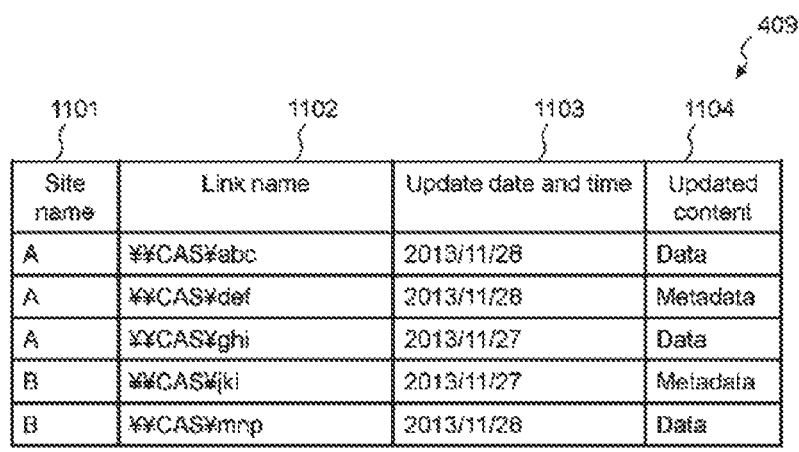
FIG. 11 is a chart showing an example of site-specific update file list of the CAS apparatus, according to the first embodiment of the present invention.

Referring back to FIG. 3, the site-specific update list 409 contains the information relating to the updated data collecting from all sites in the systems. FIG. 11 is the information showing a configuration example of the site-specific update list 409 which the CAS apparatus 121 comprises. Though the update information of all the sites is supposed to be managed by one table in the example of FIG. 11, it may also be permitted to manage each piece of the update information by using a plurality of site-specific tables.

The site-specific update list table 409 is constituted from one or more records. Each record corresponds to an object (a file or a directory). Each record comprises a site name field 1101, a link name field 1102, an update date and time field 1103, and updated content field 1104.

The site name field 1101 stores the name of the site in which the update is performed. The link name field 1102 stores the link name for identifying the file related to updates (the identification information for identifying the file such as a path). The update date and time field 1103 stores the information indicating the date and time when the corresponding file is updated. The updated content field 1105 stores the information indicating whether the updated contents are data or metadata. At this step, the metadata includes a user ID, permission, a file size, a file or directory attribute, owner change information, and others. This type of site-specific update list table makes it possible to manage the update status of data and files in each of the sites.

It should be noted that, though the contents are retained in table form as shown in FIGS. 6 to 11, other forms may also be permitted. For example, a hash table or a DB (Database) forms may also be permitted for speeding up the search.

(1-2) Details of Basic Processing

In this part, the basic processing which are used in the processing of directory operations such as creating, deleting or rename are described. It is noted that the directories, which are processed by the programs between the NAS apparatuses and the CAS apparatus, are handled by their link names stored in fields 3093 in the directory configuration information 309.

(1-2-1) Details of Data Synchronization Processing

Figure 12:
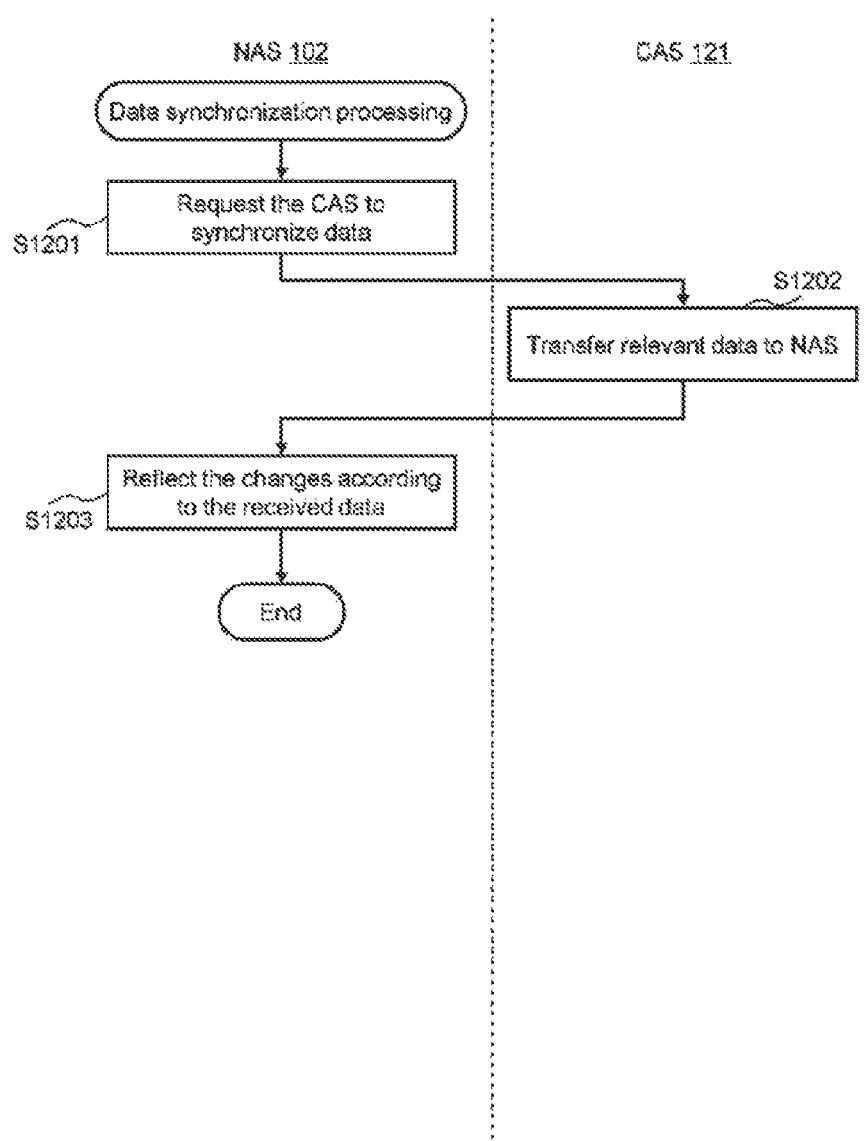
FIG. 12 is a flowchart illustrating data synchronization processing according to the first embodiment of the present invention.

FIG. 12 is a flowchart for explaining the details of the data synchronization processing.

Step S1201: The file sharing client program 307 in the NAS apparatus 102 sends a data synchronization request of the relevant directories to the CAS apparatus 121.

Step S1202: The file system program 407 in the CAS apparatus 121 receives the data synchronization request from the NAS apparatus 102 via the file sharing server program 406, and transfers the data of relevant directories to the NAS apparatus 102 according to the site-specific update list 409. The data to be transferred should describe the changes with relating to modifying the changes of the sharing namespace, such as creating, deleting or moving a directory or a group of directories and files.

Step S1203: The file sharing client program 307 in the NAS apparatus 102 receives the updated data from the CAS apparatus 121 and applies the changes to the structures of the namespace according to the received data in the local file system FS_200 in collaboration with the file system program 308.

(1-2-2) Details of Data Migration Processing

Figure 13:
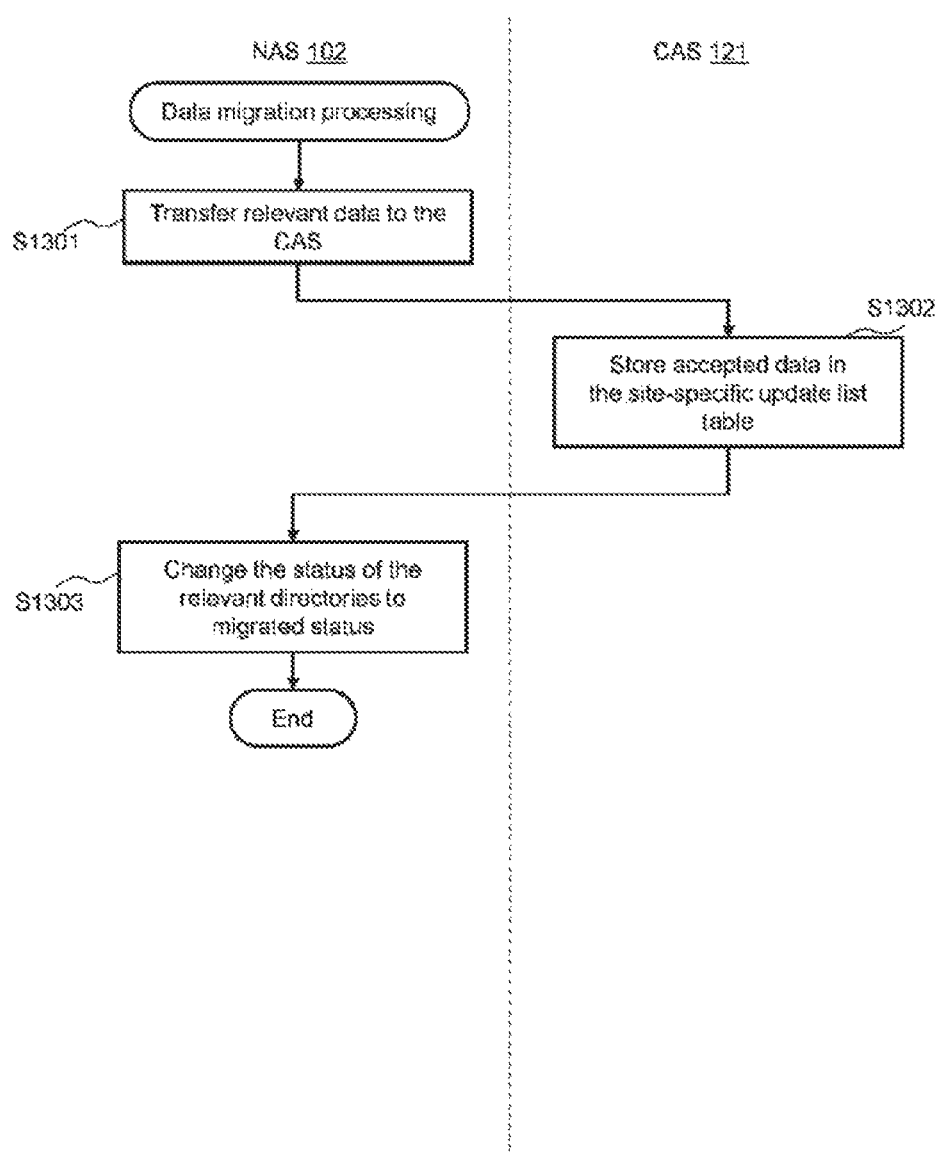
FIG. 13 is a flowchart illustrating data migration processing according to the first embodiment of the present invention.

FIG. 13 is a flowchart for explaining the migration processing by the NAS apparatus 102 in Site A 100. The migration processing is started by the file system program 308. While FIG. 13 explains the migration processing in Site A 100, the processing can be performed similarly in the file system FS_200 in Site B 110.

Step S1301: The migration program 312 in the NAS apparatus 102 transfers the migrated data to CAS apparatus 121. The migrated data is determined by the file system program 308 in the NAS apparatus 102. The migrated data includes the information describing the changes in the structure of the namespace of the file system. For example, creating, deleting or renaming one or more directories.

Step S1302: The file system program 407 in the CAS apparatus 121 stores the data received from the NAS apparatus 102 in the file system SHARE_FS 220 via the file sharing server program 406 and returns the acknowledge response to the NAS apparatus 102.

Step S1303: The migration program 312 in the NAS apparatus 102 changes the status of the relevant directories to migrated status.

(1-2-3) Details of Global Locking Processing

Figure 14:
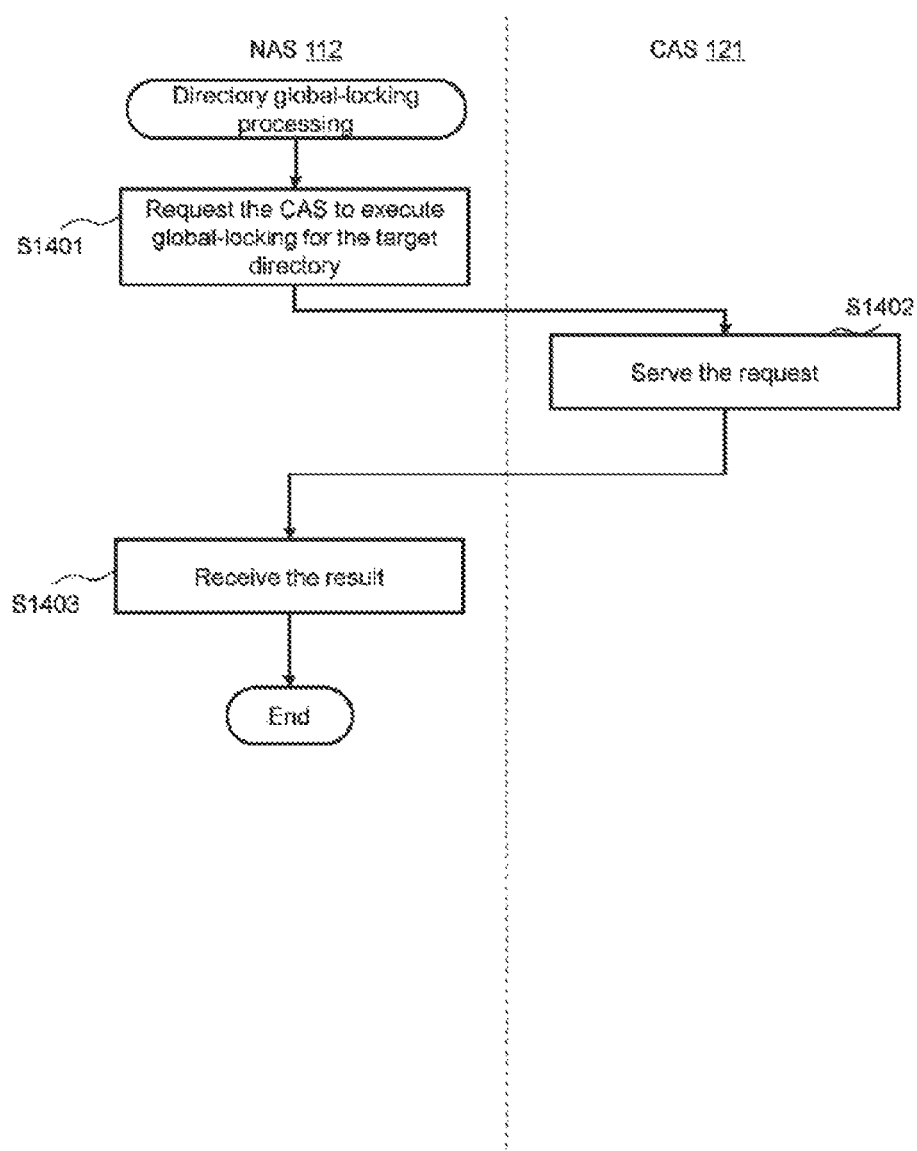
FIG. 14 is a flowchart illustrating global-locking processing according to the first embodiment of the present invention.

FIG. 14 is a flowchart for explaining the global-locking processing of a directory, which is identified by the link name stored in the field 3123 by the NAS apparatus 102 in Site A 100. The global-locking processing is started by the global-lock program 310. While FIG. 14 explains the global-locking processing in Site A 100, the processing is performed similarly as for the file system FS_200 in Site B 110.

Step S1401: The global-lock program 310 in the NAS apparatus 102 specifies the target directory and sends the request of the global-locking for the specified directory to the CAS apparatus 121. Here, the type of the request can be the request to write the lock file of the target directory identified by the link name stored in the field 1001 to the CAS apparatus 102.

Step S1402: The file system program 407 in the CAS apparatus 121 serves the request by looking for the relevant data from the global-lock manage table 408 and returns the result to the NAS apparatus 102. Here, the CAS apparatus 121 can serve to the request as accepting the request to create the lock file for the link name stored in the field 1001 if the lock file does not exist or the file system program 407 sends the global-lock status to the NAS apparatus 102.

Step S1403: The global-lock program 310 in the NAS apparatus 102 receives the result from the CAS apparatus 121. Based on whether or not the result of the request to execute the global-locking for the target directory indicates success, the global-lock program 310 is completed or retried. The realization of the retrial can be determined through the maximum number of retrials or the time-out policy.

(1-2-4) Details of Global Unlocking Processing

Figure 15:
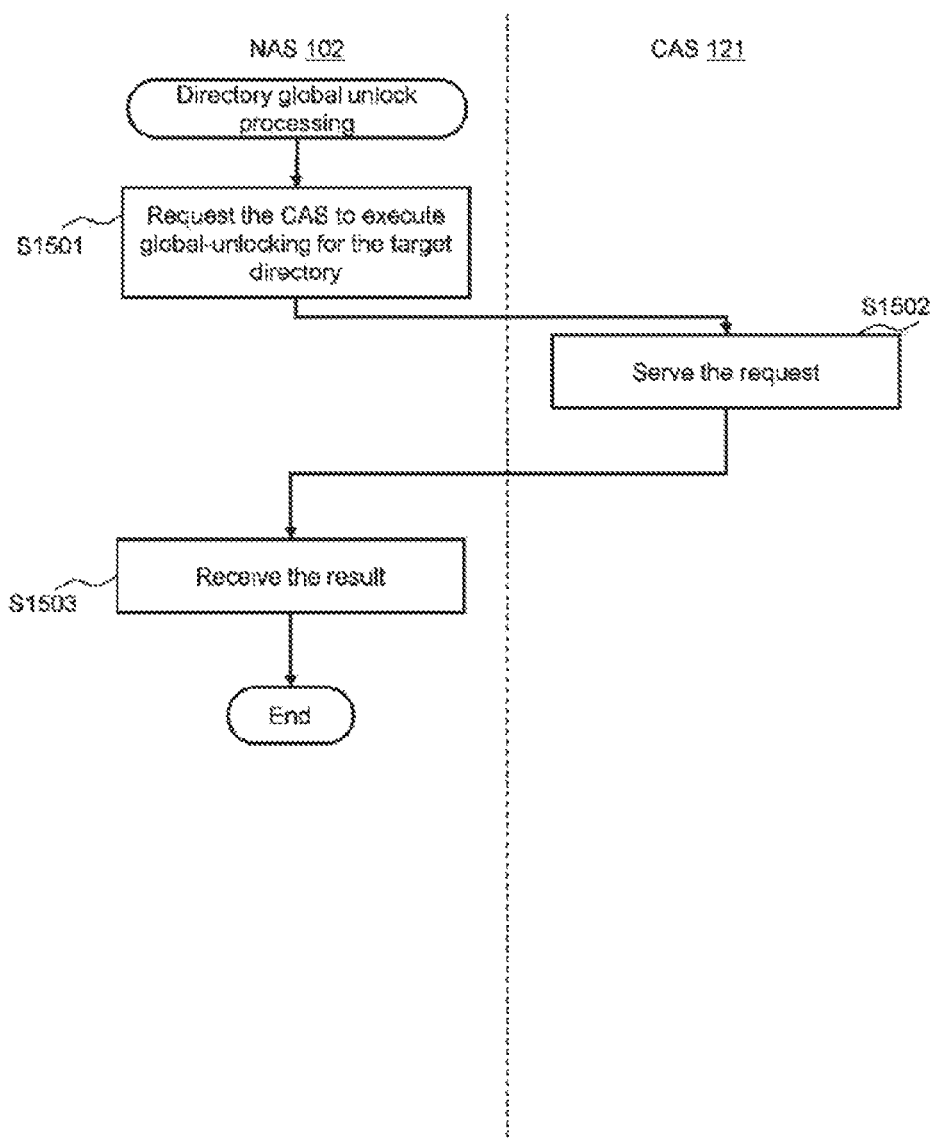
FIG. 15 is a flowchart illustrating global-unlocking processing according to the first embodiment of the present invention.

FIG. 15 is a flowchart for explaining the global-unlocking processing of a directory, which is identified by the link name by the NAS apparatus 102 in Site A 100. The global-unlocking processing is triggered by the global-lock program 310. While FIG. 15 explains the global-unlocking processing in Site A 100, the processing can be performed similarly as for the file system FS_200 in Site B 110.

Step S1501: The global-lock program 310 in the NAS apparatus 102 specifies the target directory and sends the request of the globally unlocking for the specified directory to the CAS apparatus 121. Here, the type of the request can be the request to delete the lock file of the target directory identified by the link name stored in the field 1001 to the CAS apparatus 102.

Step S1502: The file system program 407 in the CAS apparatus 121 serves the request by looking for the relevant data from the global-lock manage table 407, deletes the lock file modifies the global-lock status and returns the result to the NAS apparatus 102.

Step S1503: The global-lock program 310 in the NAS apparatus 102 receives the result from the CAS apparatus 121. Based on whether or not the result of the request to execute the global-unlocking for the target directory indicates success, the global-lock program 310 is completed or retried. The realization of the retrial can be determined through the maximum number of retrials or the time-out policy.

(1-2-5) Details of Directory Operation Command Execution Processing

In this processing, the file system program 308 in the device 102 locally executes the request to create the directory. Generally, this processing occurs without any WAN connection, hence, can be completed within considerably short time.

(1-3) Directory Creation Processing (1-3-1) Outline

Figure 5:
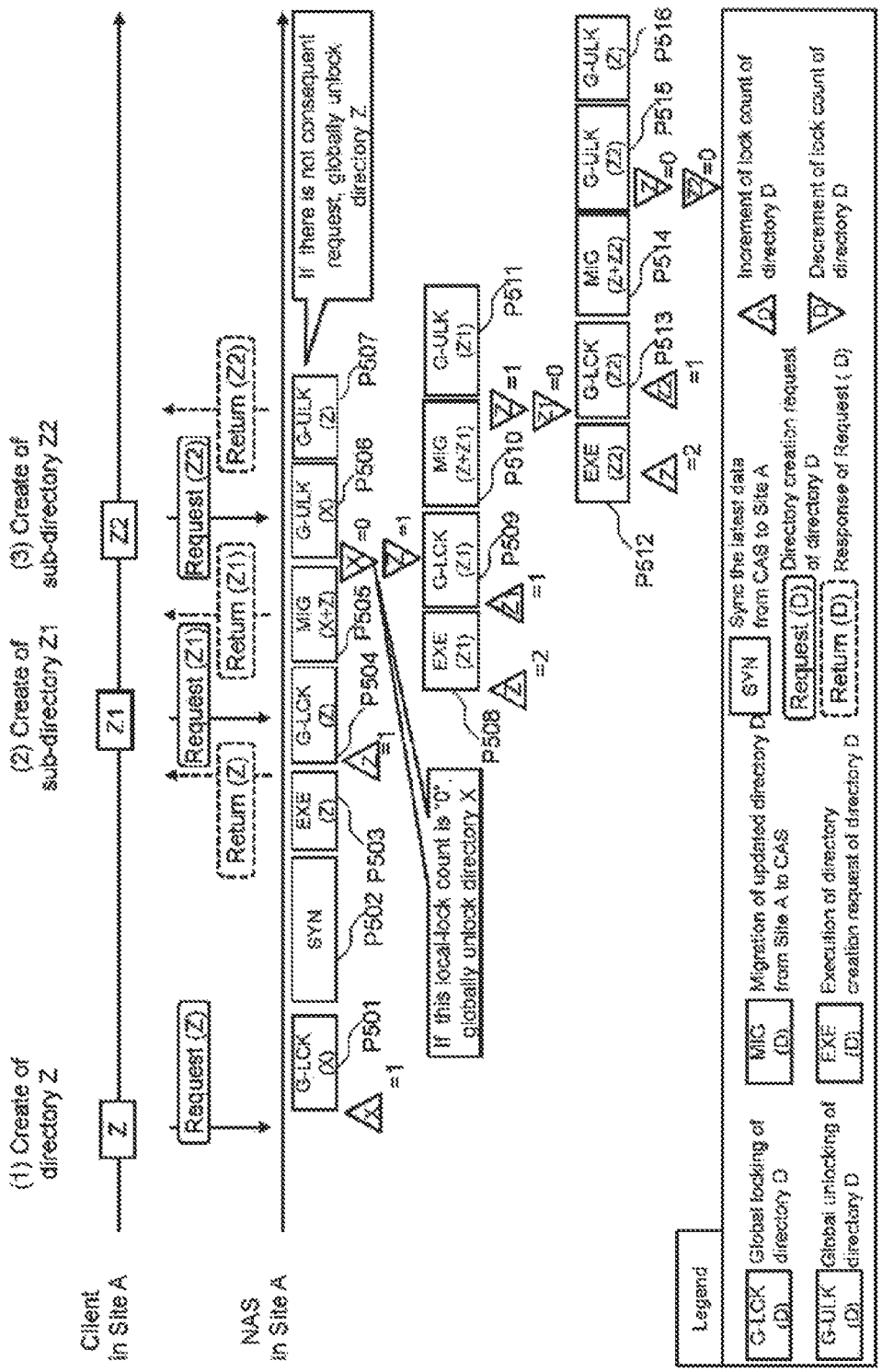
FIG. 5 is an example of a pattern diagram showing the frame format of the time chart of creating a directory that contains multiple sub-directories, according to the first embodiment of the present invention.

The outline of the processing of creating a directory that contains multiple subdirectories is explained with reference to FIG. 5. Here, in this example, the client 101 in Site A creates a directory Z, which contains two sub-directories Z1 and Z2, under the already-created directory X. Thus, there are three sub-processing for creating directories Z, Z1 and Z2 which are processed by interacting operations including above basic processing between NAS apparatus 102 and the CAS apparatus 121. Generally, the directory Z will be created at first because, in CIFS or NFS, the high level directory that is closer to the root directory will be created in advance.

At first, the sub-processing for creating directory Z is served at the NAS apparatus 102. The NAS apparatus 102 executes the global-locking processing P501 for the directory X which is the parent directory of the directory Z and increments the local-locking count of the directory X to "1." It is noted that when the directory X is globally locked by the NAS apparatus 102, it could not be further globally locked by any other NAS apparatuses in the information processing system.

Next, it is followed by the data synchronization processing P502, which is described in the above section "(1-2-1) Details of Data Synchronization Processing," between the NAS apparatus 102 and the CAS apparatus 121 to ensure that the NAS apparatus 102 should obtain the latest status of the sharing namespace before applying any modifications to it.

The NAS apparatus 102 creates the directory Z through executing the created directory request implemented at the file system program 308 and returns the results to the client 101 by the processing P503. Consequently, the NAS apparatus 102 executes the processing to reflect the new data created by this operation to the CAS apparatus 121 while accepting the next request to create the sub-directory Z1 from the client 101.

To reflect the new created data, the NAS apparatus 102 globally consequently locks the directory Z, increments the local-lock count of Z to "1" by the processing P504, and runs the migration processing P505 to reflect the created data that describes the changes of two directories X and Z to the CAS apparatus 121. After completing the migration processing P505, the NAS apparatus 102 decrements the local-locking counts of the two directories of X and Z. Here, the local-lock count of the directory X has become "0" and thus, the directory X is globally unlocked by the global-lock program 310 at the processing P506. The local-lock count of the directory Z has become "1" because it was already increased to "2" by another processing that responds to the request for creating the directory "Z1." However, if there is not any consequent request, the local-lock count of the directory Z has become "0" and it should be globally unlocked by the processing P507.

Referring back to another process responding to the request of creating the directory Z1, before running the processing P508 to execute the request for creating the directory Z1, the local-locking count of the directory Z is incremented to "2." After the executing processing P508, the NAS apparatus 102 returns the results of the request for creating the directory Z1 to the client 101, and moves to the reflection of the updated data to the CAS 121.

Here, after globally locking the directory Z1 by the processing P509, the NAS apparatus 102 reflects the new created data with relating to the directories Z and Z1 to the CAS apparatus 121 by the migration processing P510. When the processing P510 is completed, the local-lock counts of two directories of Z and Z1 are decremented. As the result, the local-lock count of the directory Z1 has become "0," thus the directory Z1 is globally unlocked by the processing P511. The local-lock count of the directory Z has become "1" because it was already increased to "2" by the other processing P512.

The processing P512 is executed by the NAS apparatus 102 to respond to the request for creating the sub-directory Z2 from the client 101. After sending the result to the client, the NAS apparatus 102 moves to the processing to transfer the new created data to the CAS apparatus 121.

The processing P513 is executed to increment the local-lock count of the directory Z2 to "1" and the migration processing P514 is executed to migrate the updated data of two directories of Z and Z2. After the migration processing P514 is completed, the local-lock counts of the directories Z and Z2 are decremented, as the result, they have respectively become "0." Hence, both of these directories are globally unlocked by the processing P515 and P516.

(1-3-2) Details

Next, the details of a creation of a directory that contains multiple sub-directories are explained with reference to FIG. 16.

Figure 16:
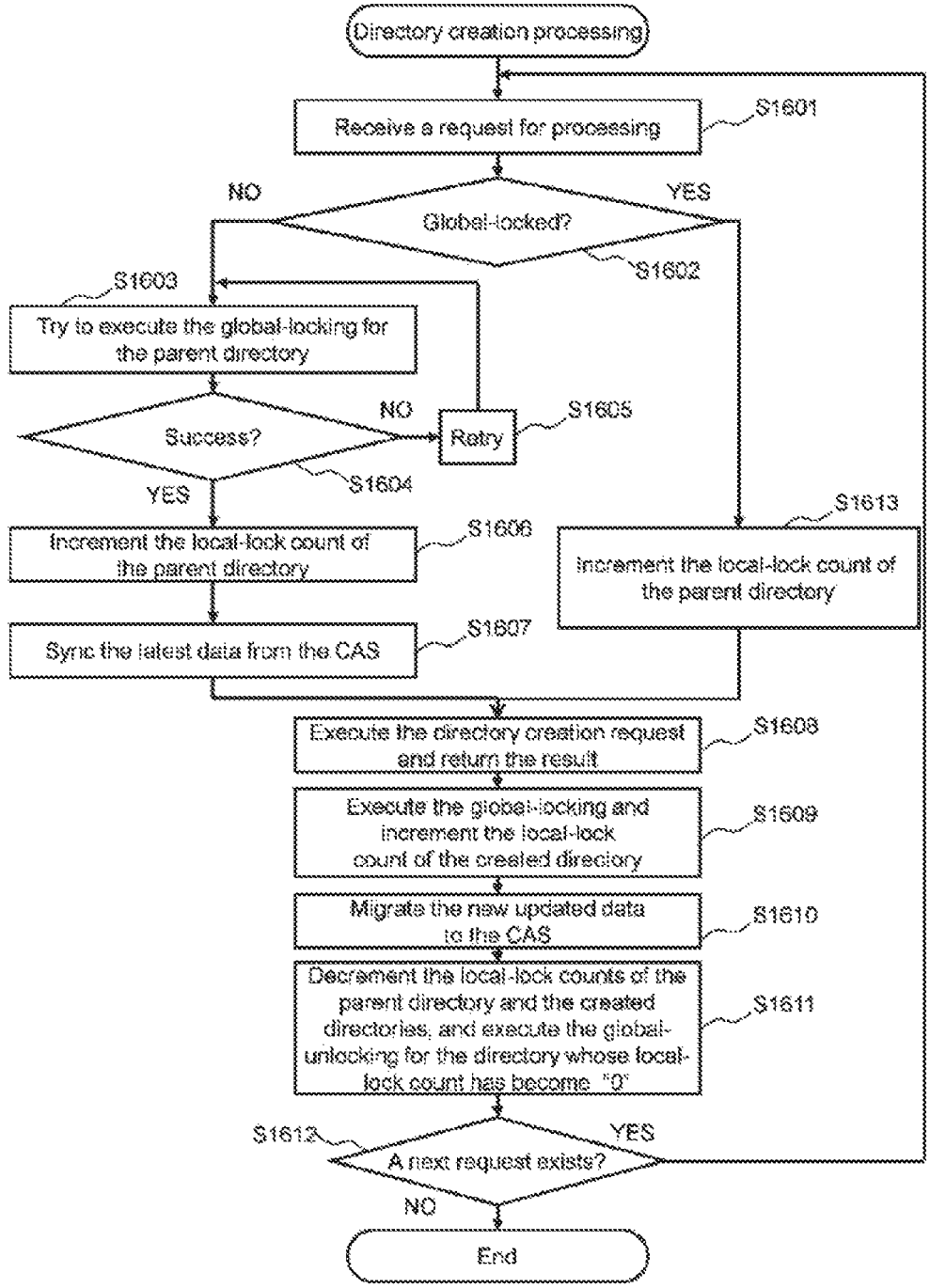
FIG. 16 is a flowchart illustrating directory creation processing for creating a directory that contains multiple sub-directories, according to the first embodiment of the present invention.

FIG. 16 shows the general flow chart for illustrating creating a directory that contains multiple sub-directories in the NAS apparatus 102. This flow chart can be applied to the other NAS apparatuses.

Step S1601: The file system program 308 in the NAS apparatus 102 receives (accepts) a directory creation request which is a request for creating a target directory to be processed.

Step S1602: The file system program 308 checks whether the parent directory of the target directory is globally locked or not. Here, the file system program 308 can check the relevant information from its memory 301 or storage media 324. If the parent directory is already globally locked, it moves to Step S1613. If it is not globally locked, it moves to Step 1603. Step S1602 is executed by referring to global-lock status fields 3133 corresponding to the parent directory in the local-lock management table 313. That is, the NAS apparatus 102 does not have to access the CAS apparatus 121 via the network 130 (140) such as WAN.

Step S1603: The file system program 308 tries to globally lock the parent directory by the global-lock program 310. As for this directory creation processing, the step where the NAS apparatus 102 has to communicate with the CAS apparatus 121 via the network 130 (140) such as WAN, can be only this step. Specifically, the NAS apparatus 102 sends a global-locking request to globally lock the parent directory. The request includes the link name of the parent directory. The CAS apparatus 121 can specify the parent directory according to the link name of the parent directory in the request. If the CAS apparatus 121 is able to globally lock the parent directory (create the lock file of the parent directory), the CAS apparatus 121 responds the result indicating success to the NAS apparatus 102. If the CAS apparatus 121 is not able to globally lock the parent directory, the CAS apparatus 121 responds the result indicating unsuccessful to the NAS apparatus 102.

Step S1604: If the result of Step S1603 is not successful, the global-lock program 310 moves to Step S1605 to retry. If the result is successful, it moves to Step S1606.

Step S1605: The global-lock request is retried until succeed or until reaching the maximum of time out period or the number of retrials depends on implementation policies. If the applicable policy is violated, the global-lock program 310 can return an error to the calling program.

Step S1606: The file system program 308 increments the local-lock count of the parent directory, saves the new value to the local-lock management table 313 and moves to Step S1607.

Step S1607: The sync program 311 is called to synchronize the data between the NAS apparatus 102 and the CAS apparatus 121. Here, depending on the performance requirements, transferring from the CAS apparatus 121 the whole data or only a part of the data that relevant to the processing directories is choosable.

Step S1608: The file system program 308 executes the directory creation request, returns the result to the client 101 and makes preparations for receiving other requests.

Step 1609: The file system program 308 globally locks the created directory by the global-lock program 310, and increments the local-locking count of the created directory in the local-lock management table 313.

Step S1610: The migration program 312 is called to transfer the updated data to the CAS apparatus 121. It is noted that typically the consistency of the sharing namespace is maintained because, such updated data, which shows the changes in the structure of the sharing namespace of the system, are only reflected under the global-lock of the parent directory and creating directory. These locks were already acquired at the previous step S1609.

Step S1611: After completing the migration tasks at Step S1610, the file system program 308 decrements the local-lock counts of the created directory and its parent directory. Here, via the global-lock program 310, the file system program 308 decides to globally unlock the directories, of which local-lock counts are "0."

Step S1612: The file system program 308 checks whether the next request for creating another directory exists or not. If there is not any further request, the file system program 308 is completed. If there is still another request, it moves back to Step S1601.

Step S1613: This step is called when the result of Step S1102 is YES. As the file system program 308 in the NAS apparatus 102 is currently obtaining the global-lock of the parent directory, the synchronization between the NAS apparatus 102 and the CAS apparatus 121 is not necessary. The reason is that apart from the modifications that are being applied to the namespace, the part of the namespace which belongs to the current parent directory is already the same as at the CAS apparatus 121. Here, in this step, similarly to Step S1606, the file system program 407 increments the local-lock count of the parent directory, updates the new value to the local-lock management table 313 and moves to Step S1608.

According to the above mentioned explanation, during creating multiple subdirectories, the number of WAN connections required is significantly reduced, hence it is possible to shorten the processing time.

(1-3-3) Lazy Migration

Here, in this embodiment, it is noticed that the migration of the updated data of the parent directory can be delayed for a better performance by modifications at Step S1610 and Step S1611. Currently, the updated data of the parent directory is aggressively migrated to the CAS apparatus 121 as it is executed whenever a subdirectory is created. In such cases, the performance may be degraded when the number of created sub-directories is high because of the bottleneck in writing the updated data to the same object occurred at the CAS apparatus 121.

As a result, instead of aggressive migration, the updated data of the parent directory can be delayed until the local-lock count of the parent directory is decremented from "1" to "0." The reason is that the consistency of the sharing file system is guaranteed that when the NAS apparatus 102 sees the local-lock count of a directory is greater than "0," it means that the directory cannot be changed by any other NAS apparatuses.

Specifically, after Step S1609 is completed, the NAS apparatus 102 decrements the local-lock counts of the parent directory and the created directory. Next, only the updated data of the directories whose the local-lock counts have become "0" are migrated to the CAS apparatus 121. Finally, those directories are globally unlocked.

The above described modification can also be applied to other operations such as deleting, renaming or moving directories, etc. besides creating directories.

(1-4) Details of Directory Deletion Processing

Figure 17:
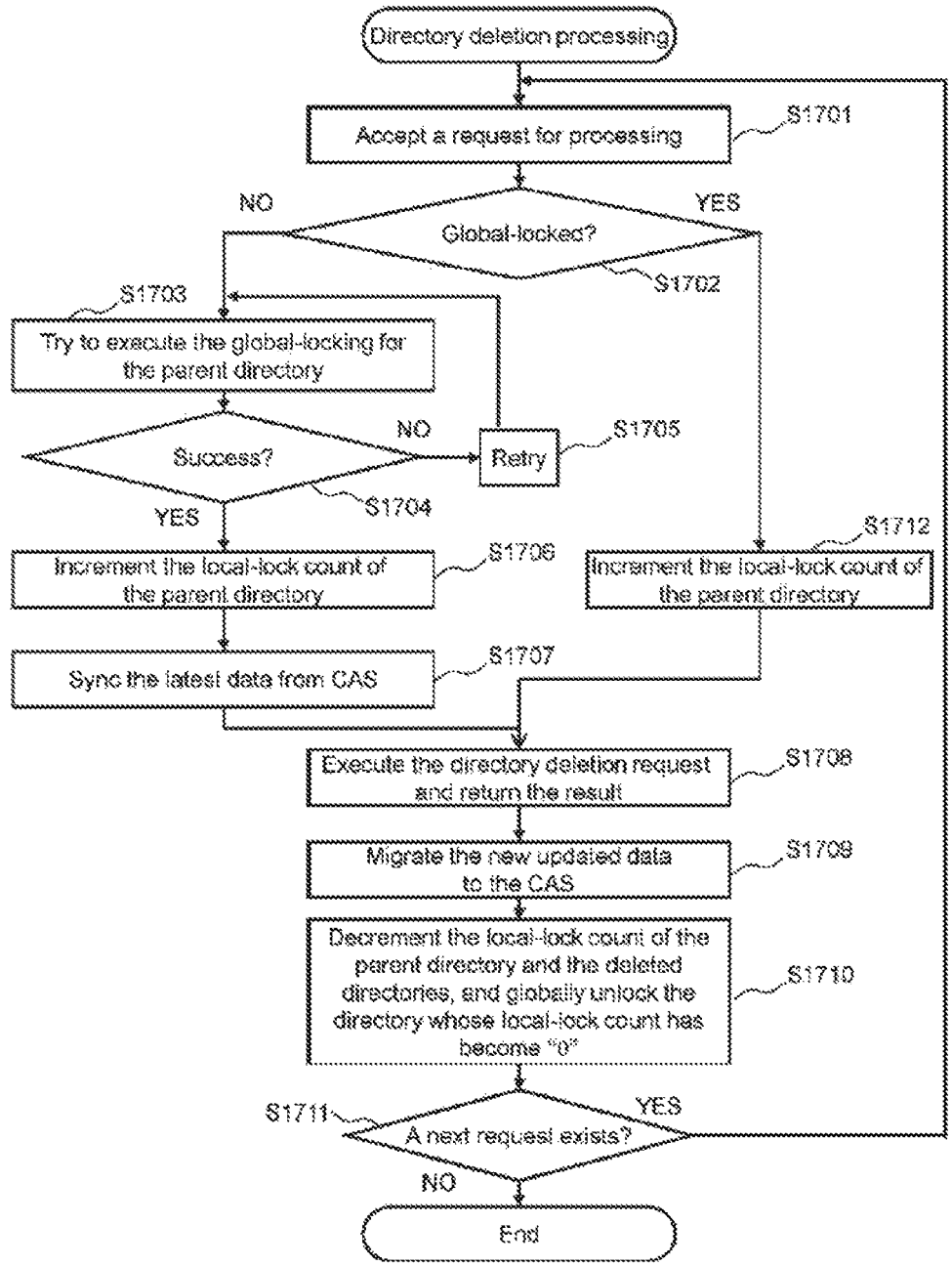
FIG. 17 is a flowchart illustrating directory deletion processing for deleting a directory that contains multiple sub-directories, according to the first embodiment of the present invention.

FIG. 17 illustrates of the flow chart of the processing of deleting a directory that contains multiple sub-directories in the NAS device 102. This flow chart can be applied to the other NAS apparatuses. Basically, the flow chart of the directory deletion processing is similar to the directory creation processing except two following main points.

The first point is the consequence of the deleting directories that will be processed by the file system program 308 in the NAS apparatus 102. In contrast to creating cases, in deleting cases, the directories that are further from the root directory are processed in advance according to the protocol specified in NFS or CIFS.

The second point is that there is not the step corresponding to Step 1609 between Step 1708 corresponding to Step 1608 and Step 1709 corresponding to Step 1610. That's because there is not directories newly created. Accordingly. Steps 1701 to 1712 respectively correspond to Steps 1601 to 1608 and 1610 to 1613 in FIG. 16.

(1-5) Details of Directory Rename or Move Processing

The operation of moving a target directory, which contains multiple sub-directories, from a source directory to a destination directory is described. The source directory is the parent directory of the target directory before the move of it. The destination directory is the parent directory of the target directory after the move of it. In this embodiment, it is required that at first, both the source directory and the destination are globally locked. Then, the moving operation of the target directory is realized by modifying the contents of the entries of the two directories. Next, the updated contents are migrated to the CAS device 121. Finally, the process is completed by globally unlocking the two directories.

Figure 24:
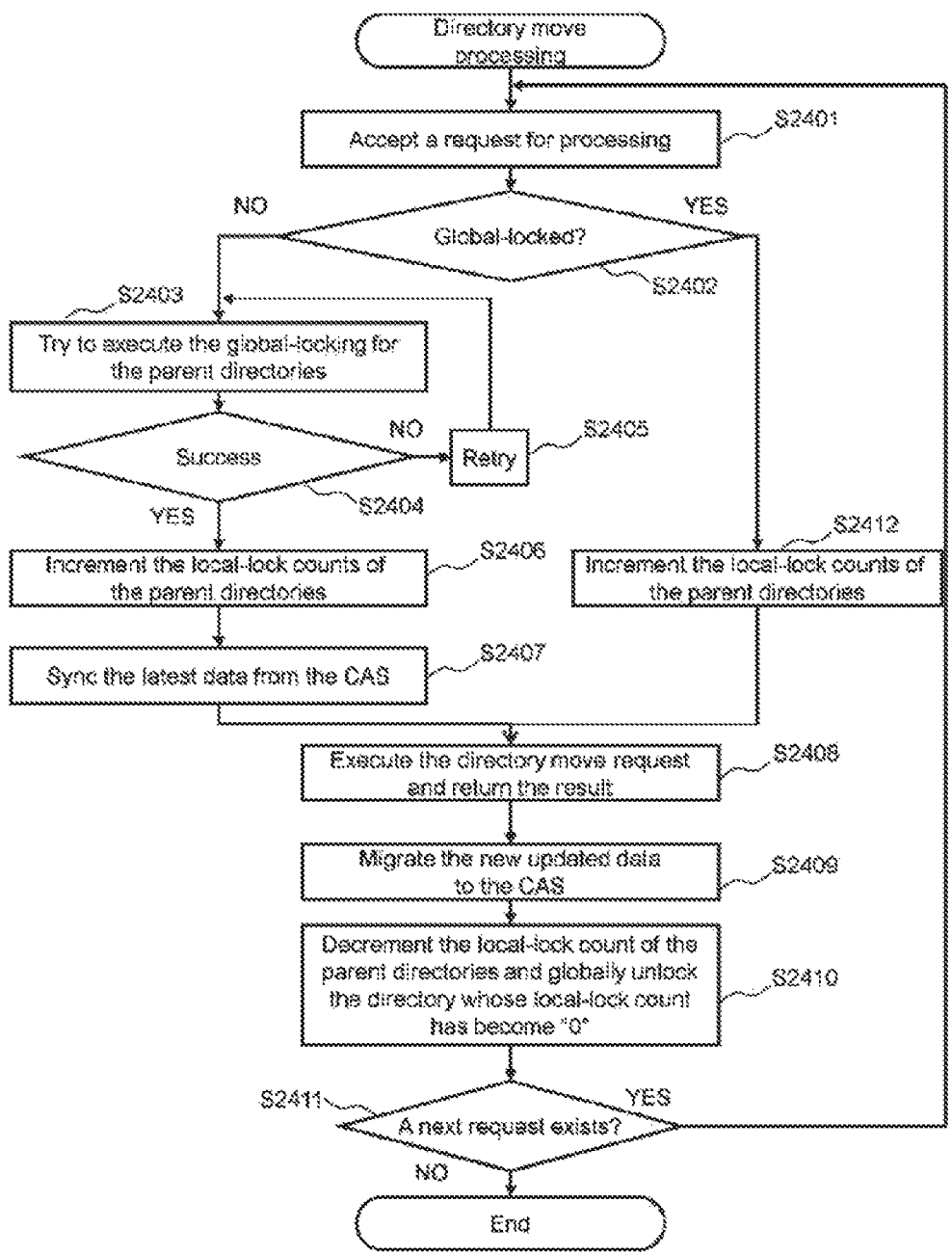
FIG. 24 is a flowchart illustrating directory move processing for moving a directory that contains multiple sub-directories, according to the first embodiment of the present invention.

The detail flow chart of the moving operation is described in FIG. 24. It is noted that Steps 2401 to 2412 respectively correspond to Steps 1701 to 1712 in FIG. 17.

It is noticed that a renaming operation is a special case of the moving operation. In such operation, instead of two parent directories (a source directory and a destination directory) in the moving operation, only one parent directory is needed to be globally-locked. Next, the target directory is renamed and the updated data that reflects the result of this operation is migrated to the CAS device 121. Finally, the local-lock count of the parent directory is decrement and if it has become "0," then the parent directory is globally-unlocked.

(2) Second Embodiment

Hereinafter, the second embodiment of the present invention is explained. It should be noted that the differences from the first embodiment are mainly described below, and the explanation of what is common to the first embodiment is omitted or simplified.

In the first embodiment, it is explained that a single directory is global-locked or global-unlocked by the global-lock program 310 in the NAS apparatus 102. However, there is a case that multiple directories should be global-locked or global-unlocked by a single global-lock program 310 that requires only a single WAN connection. For example, in the simple case like renaming directories, at least the source and the destination directories should be global-locked or global-unlocked together.

In the second embodiment, the global-locking processing and the global-unlocking processing support the utility of batch global-locking or global-unlocking. It means that multiple directories are collectively global-locked or global-unlocked, hence the number of WAN connections needed is significantly reduced.

(2-1) Batched Global-Lock Processing

Figure 18:
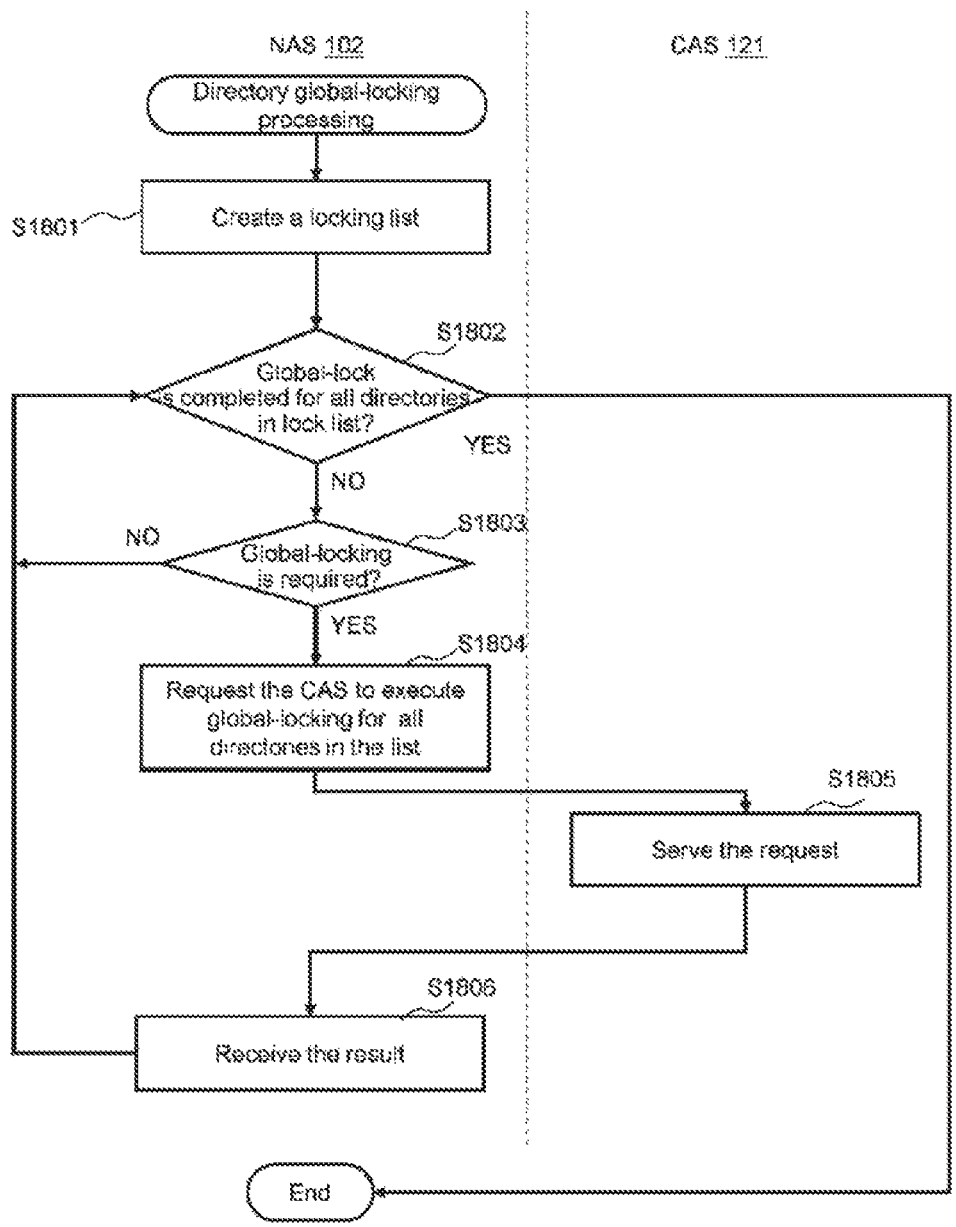
FIG. 18 is a flowchart illustrating a hatched global-locking processing according to the second embodiment of the present invention.

FIG. 18 shows a flow chart for explaining a batched global-locking processing according to the second embodiment. The batched processing is called by the global-lock program 310 in the NAS apparatus 102.

Step S1801: By the indications receiving from the file system program 308, the global-lock program 310 creates a locking list containing the link names of the directories which are targets globally locked. The link names in the created list are the same names as the link names stored in fields 3093.

Step S1802: The global-lock program 310 in the NAS apparatus 102 in Site A checks whether the global-locking processing is completed for all the directories in the locking list or not. If the global-locking processing is completed for all the directories in the locking list (in case of YES at the step S1802), the global-lock program 310 in the NAS apparatus 102 completes the batched processing of global-locking.

Step S1803: Meanwhile, if the global-locking processing is not completed for all the directories in the locking list (in case of NO at the step S1802), the global-lock program 310 in the NAS apparatus 102 determines whether global-locking for the relevant directories (which are one ore more directories) are necessary or not. If further global-locking is not necessary (in case of NO at the step S1803), the processing proceeds to the step S1802.

Step S1804: Meanwhile, if global-locking for the relevant directories are necessary (in case of YES at the step S1803), the global-lock program 310 in the NAS apparatus 102 executes the global-locking by pushing the lock files of the processing target directories via the file sharing client program 307 to the CAS apparatus 121.

Step S1805: The file system program 407 in the CAS apparatus 121 receives (accepts) the batch global-locking request from the NAS apparatus 102 via the file sharing server program 406 by storing the lock files, and returns the result of the process to the NAS apparatus 102. The global-locking request includes the locking list containing link names of all the target directories. The CAS apparatuses 121 can specify the target directories according to the locking list and associate the lock files with the target directories by batch.

Step S1806: The global-lock program 310 in the NAS apparatus 102 receives the result from the CAS apparatus 121 via the file sharing client program 305.

As explained above, in the second embodiment, processing time can be reduced by the batch global-locking processing because smaller number of WAN connections is needed.

(2-2) Batched Global-Unlocking Processing

Figure 19:
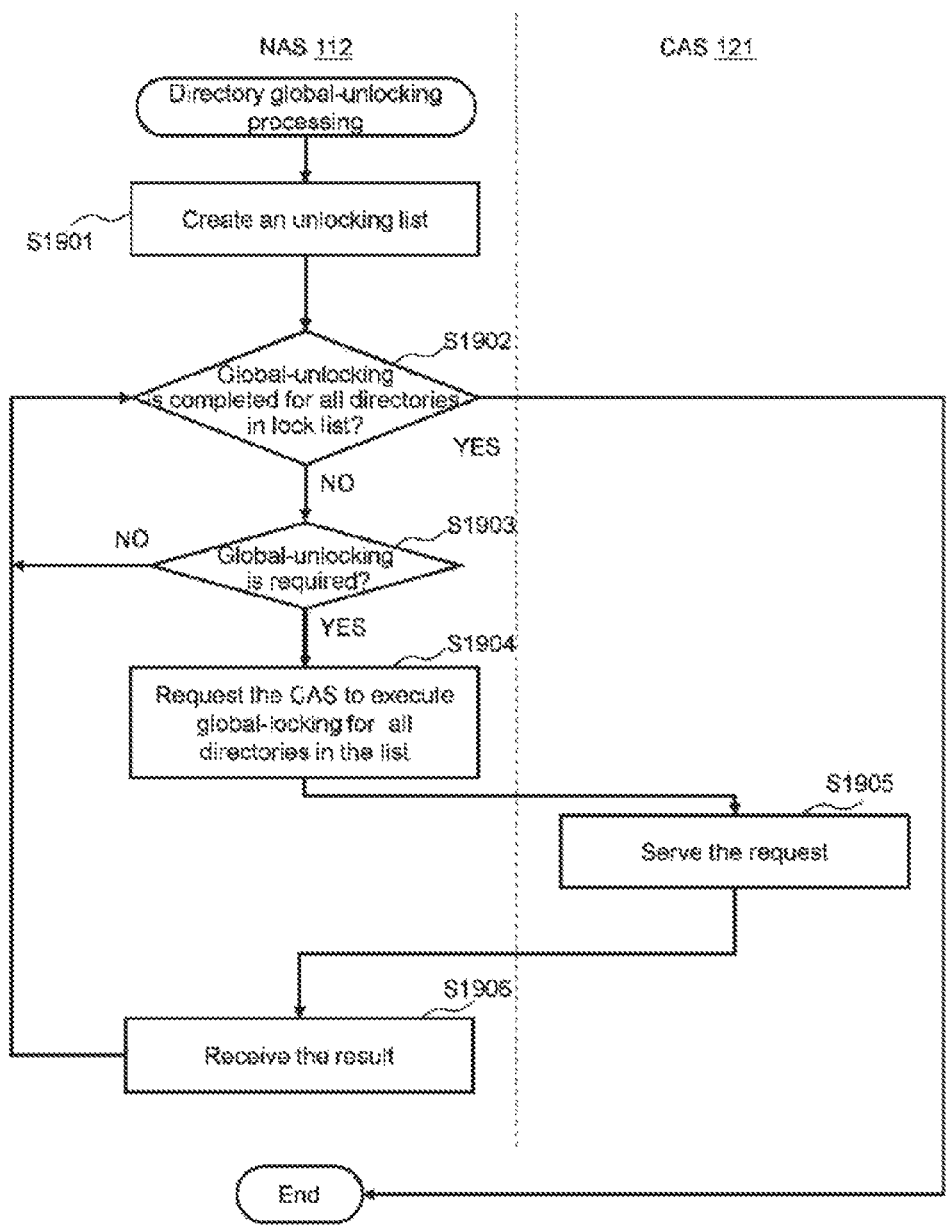
FIG. 19 is a flowchart illustrating a batched global-unlocking processing according to the second embodiment of the present invention.

FIG. 19 shows a flow chart for explaining a batched global-unlocking processing by the second embodiment. It is noted that Steps 1901 to 1906 respectively correspond to Steps 1801 to 1806 in FIG. 18.

Basically, batched global-unlocking processing is executed similarly to batched global-locking processing explained above. The only difference point is that, instead of pushing the lock files, the global-lock program 310 sends the request, to the CAS apparatus 121, to delete the relevant lock files, which are stored in the CAS apparatus 121.

(3) Third Embodiment

Hereinafter, the third embodiment of the present invention is explained. It should be noted that the differences from the first and second embodiments are mainly described below, and the explanation of what is common to the first and second embodiments is omitted or simplified.

In the first and second embodiments, there is only one CAS apparatus in the data center 120. In the third embodiment, there are multiple CAS apparatuses in the data center to maintain in scalable way the namespace and data which are share among the NAS apparatuses.

(3-1) Physical System Configuration

Figure 20:
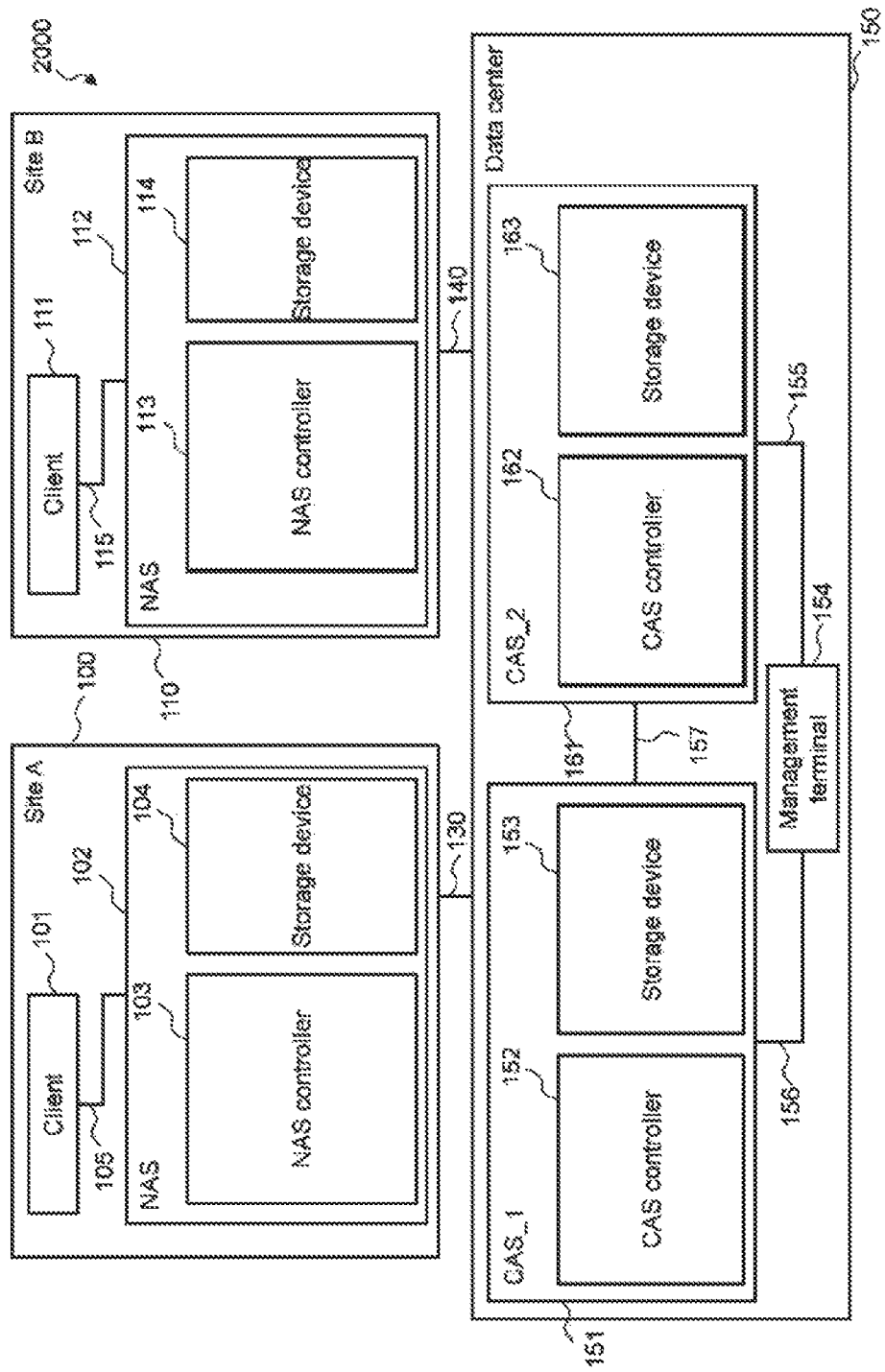
FIG. 20 is a diagram showing a physical schematic configuration of the information processing system according to the third embodiment of the present invention.

FIG. 20 illustrates the physical configuration of the system according to the third embodiment. Although in the data center 150, there are two CAS apparatuses, CAS_1 and CAS_2, other CAS apparatuses also can be included and connected together and with the management terminal 154.

The network 157 performs the network connection among the CAS apparatuses (CAS_1 apparatus 151 and the CAS_2 apparatus 161 in this example). The network 156 performs the network connection between the CAS_1 apparatus 151 and the management terminal 154, while the network 155 performs the network connection between the CAS_2 apparatus 161 and the management terminal 154.

(3-2) Logical System Configuration

Figure 21:
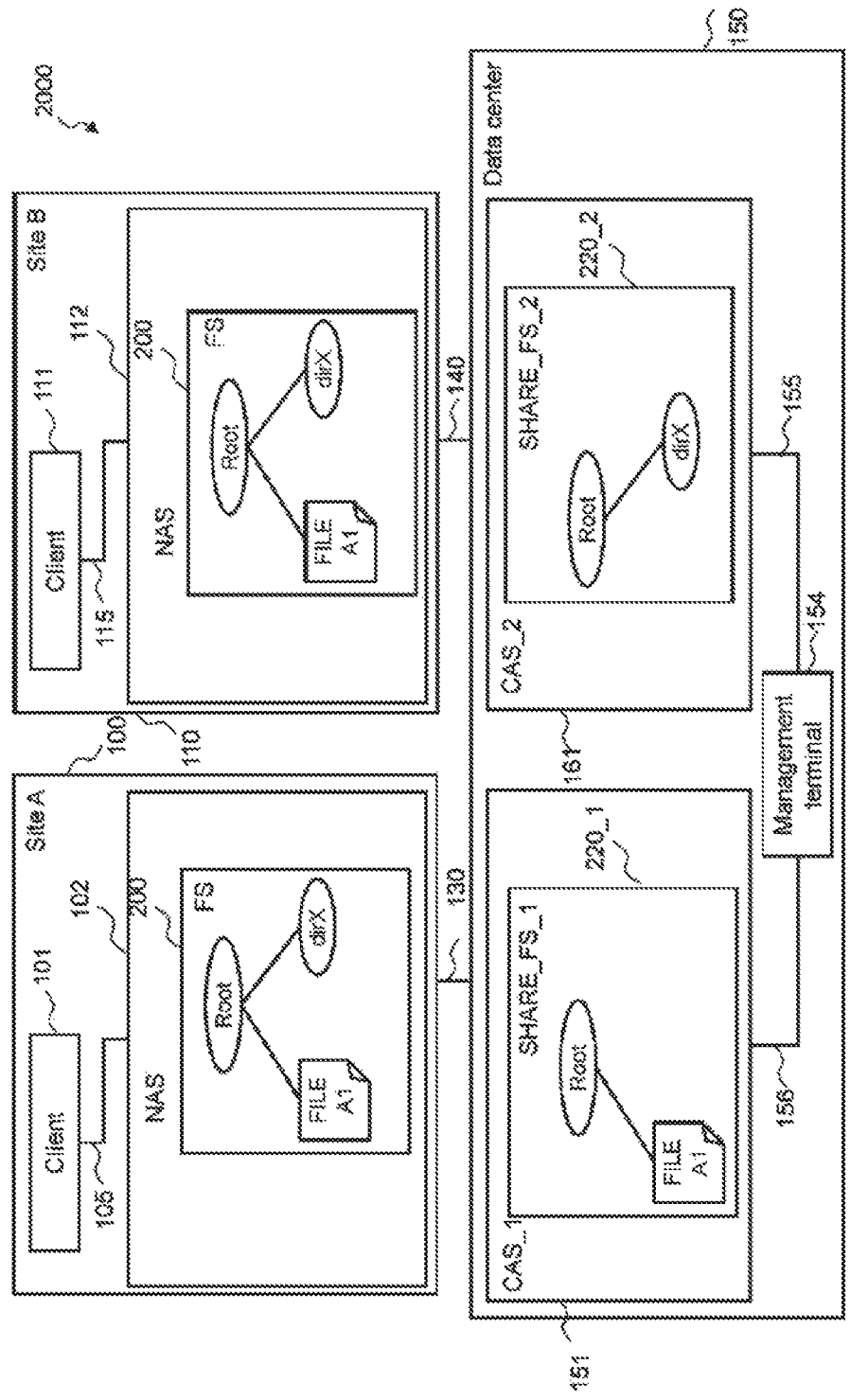
FIG. 21 is a diagram showing a logical configuration of the information processing system according to the third embodiment of the present invention.

FIG. 21 is a block diagram showing an example of the logical configuration of the information processing system according to the third embodiment. In the relevant information processing system 2000, the client 101 of Site A 100 and the client 111 of Site B 110 read and write the data which is stored as files and directories in a file system FS_200. The namespace and data of the file system FS_200 are intensively managed by the SHARE_FS_1_220_1 and the SHARE_FS_2_220_2 created at the CAS_1 device 151 and the CAS2_device 161.

(3-3) Internal Configuration of the CAS Apparatuses

Figure 22:
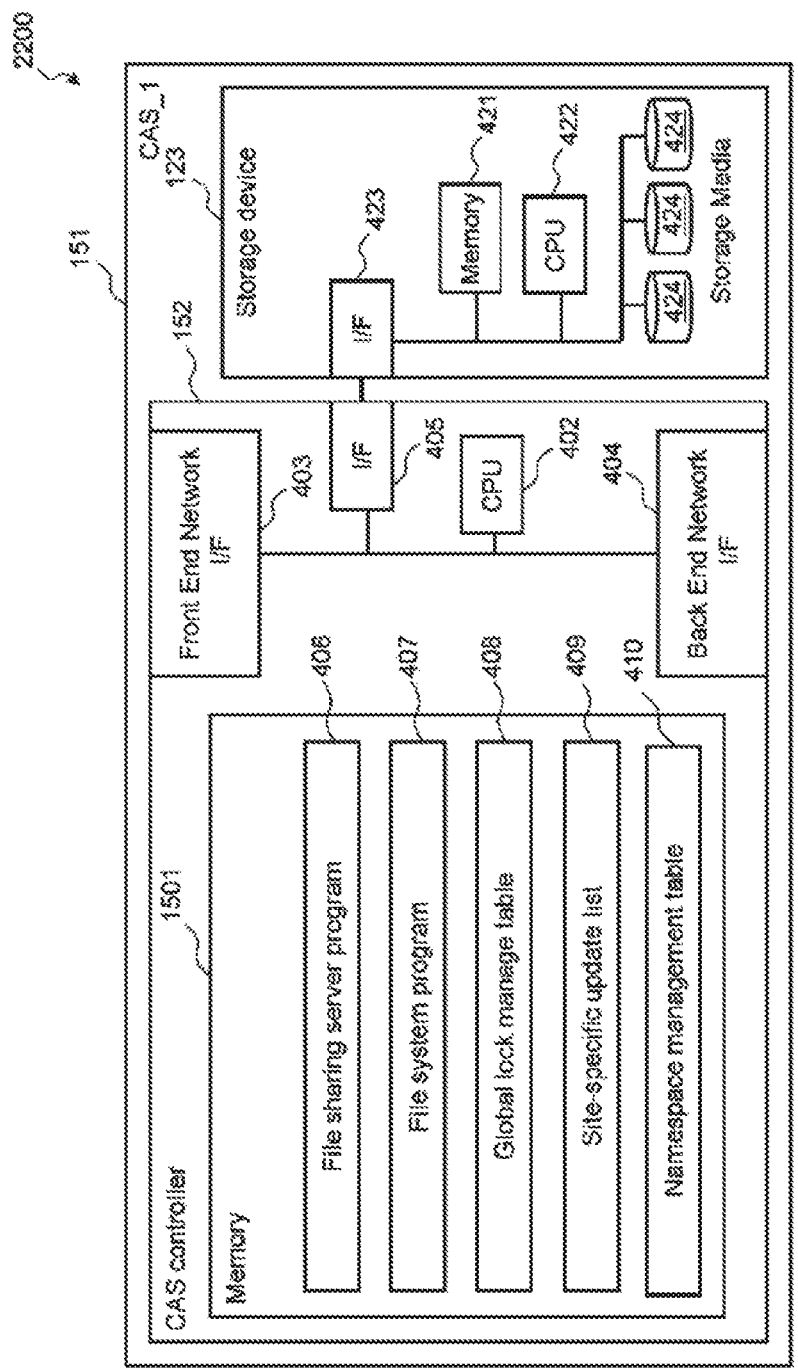
FIG. 22 is a diagram showing a hardware and software configuration of a CAS apparatus according to the third embodiment of the present invention.

FIG. 22 describes the internal configuration of the CAS_1 device 151. A similar configuration is implemented in the other CAS apparatuses.

Here, in the third embodiment, the namespace management table 410 is added into the memory 1501 of the CAS controller 152. The functionality of the namespace management table 410 is to determine which CAS apparatus will maintain which part of the namespace of the file system FS_200 which is shared among the NAS apparatuses.

In the third embodiment, the file sharing server program 406, after receiving the request from the NAS apparatus, refers to the namespace management table 410 to identify the CAS apparatus that is responsible to this request. Then, the file sharing server program 406 forwards the request to the identified CAS apparatus. Finally, the identified CAS apparatus serves the request and returns the results to the requesting NAS apparatus.

Figure 23:
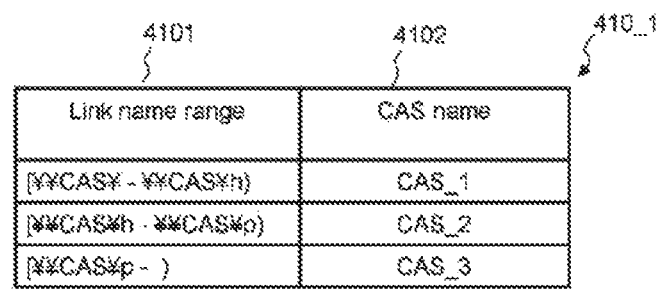
FIG. 23 is a chart showing an example of a namespace manage table according to the third embodiment of the present invention.

As shown in FIG. 23, the namespace management table 410 is constituted from one or more records. Each record corresponds to a link name range. Each record comprises a link name range field 4101 and a CAS name field 4102. The link name range field 4101 stores the link name range which is the range of the link name. The CAS name field 4102 stores the name of the CAS apparatus that is responsible for processing the link name that belongs to the range of the link name.

According to FIG. 23, the link names that belongs to the range "[\\CAS\-\\CAS\h)" are maintained by the CAS_1 device. Furthermore, the link names that belong to the range "[\\CAS\h-\\CAS\p)" are maintained by the CAS_2 device. Finally, the link names that belongs to the range "[\\CAS\p~)" are maintained by the CAS_3 device. Other techniques such as distributed hashing or distributed binary tree to determine the namespace management table 310 are applicable.

(4) Forth Embodiment

The forth embodiment is the combination of the second and third embodiments 3 to realize the global-locking processing and scalably maintain the sharing namespace. In this embodiment, the overall throughput performance of the global-locking processing or the global-unlocking processing is expectedly improved.

While some embodiments have been described above as an illustrative description of the invention, the invention is not limited to these embodiments. The invention may be worked out in various other forms.

For example, the conflict between a directory and a file could occur in the information processing system according to any one of the above mentioned embodiments. In the embodiments, because the directory operations are focused, reflecting changes relating to file operations is asynchronously achieved. Generally, the updated files created in NAS apparatuses are transferred to the CAS apparatus (CAS apparatuses) by the migration progressing described previously in FIG. 13. The migration processing are triggered by periodic schedulers or by other policies defined by the administrators. Then these updated files are transferred to other NAS apparatuses during the synchronization processing. Here, the conflict between files and directories could occur due to the asynchronous delay in file migrations. Several solutions relating to policies and implementations to overcome the conflicts are realizable. Generally, the directory is prioritized and the conflicted files are transparently moved to separate locations in the file system. The new locations are then noticed to appropriate users via message notifications or other comparable tools. Here, it is ensured that, no data loss occurs because of this conflict.

REFERENCE SIGN LIST 102 and 112: NAS apparatus
121: CAS apparatus

The invention claimed is:

1. A computer system for sharing objects including at least directories, the computer system comprising:
multiple front-end nodes that are coupled to clients; and
a back-end node being configured to provide a namespace shared by the multiple front-end nodes,
a first front-end node that is any one of the multiple front-end nodes, being configured to manage local-lock counts for each of directories managed by the first front-end node, the local-lock count being the number of locks taken by operations to the objects including the directory and sub-objects thereof,
the first front-end node being configured to, every time an update request is received for processing a target object from a client that is coupled to the first front-end node, request the back-end node to lock a parent directory of the target object and increment the local-lock count for the parent directory when the parent directory has not been locked by the back-end node,
the first front-end node being configured to send a response of the received update request to the client regardless of whether or not the parent directory has been unlocked by the back-end node, and
the first front-end node being configured to, when the local-lock count of the parent directory is zero, request the back-end node to unlock the parent directory,
wherein the first front-end node is configured to migrate not only the processed target object but also the parent directory thereof to the back-end node, and the first front-end node is configured not to migrate the parent directory of the processed target object to the back-end node when the local-lock count of the parent directory of the processed target object has not become zero, and the first front-end node is configured to migrate the parent directory of the processed target object to the back-end node when the local-lock count of the parent directory of the processed target object has become zero,
wherein the first front-end node is configured to, when completing migration of the processed target object to the back-end node, decrement the local-lock counts of the processed target object and the parent directory thereof, and
wherein the first front-end node is configured to, when at least one of the local-lock counts of the processed target object and the parent directory has become zero, request the back-end node to unlock the at least one of the processed target object and the parent directory whose local-lock count has become zero.

2. The computer system according to claim 1, wherein
the first front-end node is configured to, when requesting the back-end node to lock a directory, increment the local-lock count of the directory, and
the first front-end node is configured to, when processing the target object, increment the local-lock count of the parent directory of the target object.

3. The computer system according to claim 1, wherein
the first front-end node is configured to manage the local-lock counts using management information stored in the first front-end node, the management information includes a link name, global-lock status and the local-lock count for each of directories managed by the first front-end node,
the link name is the name of the link to the directory managed by the back-end node from the first front-end node,
the global-lock status is the status indicating whether or not the corresponded directory has been locked by the back-end node, and the first front-end node is configured to determine whether or not the parent directory has been locked by the back-end node, based on the management information.

4. The computer system according to claim 1, wherein
the received update request for processing the target object is a creation request for creating the target directory, and
the first front-end node is configured to increment the local-lock count of a directory newly created in response to the creation request, as well as the local-lock count of the parent directory of the directory newly created.

5. The computer system according to claim 1, wherein the received update request for processing the target object is a deletion request for deleting the target object.

6. The computer system according to claim 1, wherein the received update request for processing the target object is a rename request for renaming the target object.

7. The computer system according to claim 1, wherein
the received update request for processing the target object is a move request for moving the target object, and
the first front-end node is configured to increment the local-lock counts of a source directory and a destination directory,
the source directory is the parent directory of the target object before the move thereof, and
the destination directory is the parent directory of the target directory after the move thereof.

8. The computer system according to claim 1, wherein the first front-end node is configured to
create locking information indicating all objects which are targets locked, and
send the back-end node a locking request to lock the all objects, the locking request being associated with the locking information.

9. The computer system according to claim 1, wherein the first front-end node is configured to
create unlocking information indicating all objects which are targets unlocked, and
send the back-end node an unlocking request to unlock the all objects, the unlocking request being associated with the unlocking information.

10. A computer for sharing objects with another computer that is coupled to a storage apparatus for providing a shared namespace to store the objects, the objects including at least directories, the computer comprising:
an interface that is coupled to the storage apparatus and a client;
a memory being configured to store management information including local-lock counts for each of directories, the local-lock count being the number of locks taken by operations to the objects including the directory and sub-objects thereof; and
a processor that is coupled to the interface and the memory,
the processor being configured to, every time an update request is received for processing a target object from the client, request the storage apparatus to lock a parent directory of the target object and increment the local-lock count for the parent directory when the parent directory has not been locked by the storage apparatus,
the processor being configured to send a response of the received update request to the client regardless of whether or not the parent directory has been unlocked by the storage apparatus, and
the processor being configured to, when the local-lock count of the parent directory is zero, request the storage apparatus to unlock the parent directory,
wherein the processor is configured to migrate not only the processed target object but also the parent directory thereof to the back-end node, and the first front-end node is configured not to migrate the parent directory of the processed target object to the back-end node when the local-lock count of the parent directory of the processed target object has not become zero, and the processor is configured to migrate the parent directory of the processed target object to the back-end node when the local-lock count of the parent directory of the processed target object has become zero,
wherein, the processor is configured to, when completing migration of the processed target object to the back-end node, decrement the local-lock counts of the processed target object and the parent directory thereof, and
wherein the processor is configured to, when at least one of the local-lock counts of the processed target object and the parent directory has become zero, request the back-end node to unlock the at least one of the processed target object and the parent directory whose local-lock count has become zero.

11. A method for sharing, by multiple front-end nodes that are coupled to clients, objects including at least directories managed in a namespace provided to the multiple front-end nodes by a back-end node, the method comprising:
managing, by a first front-end node that is any one of the multiple front-end nodes, local-lock counts for each of directories managed by the first front-end node, the local-lock count being the number of locks taken by operations to the objects including the directory and sub-objects thereof,
every time an update request is received for processing a target object from a client that is coupled to the first front-end node, requesting, by the first front-end node, the back-end node to lock a parent directory of the target object and increment the local-lock count for the parent directory when the parent directory has not been locked by the back-end node,
sending, by the first front-end node, a response of the received update request to the client regardless of whether or not the parent directory has been unlocked by the back-end node, and
requesting, by the first front-end node, the back-end node to unlock the parent directory, when the local-lock count of the parent directory is zero,
wherein the first front-end node is configured to migrate not only the processed target object but also the parent directory thereof to the back-end node, and the first front-end node is configured not to migrate the parent directory of the processed target object to the back-end node when the local-lock count of the parent directory of the processed target object has not become zero, and the first front-end node is configured to migrate the parent directory of the processed target object to the back-end node when the local-lock count of the parent directory of the processed target object has become zero,
wherein the first front-end node is configured to, when completing migration of the processed target object to the back-end node, decrement the local-lock counts of the processed target object and the parent directory thereof, and
wherein the first front-end node is configured to, when at least one of the local-lock counts of the processed target object and the parent directory has become zero, request the back-end node to unlock the at least one of the processed target object and the parent directory whose local-lock count has become zero.

* * * * *